United States Patent
Liu et al.

(10) Patent No.: US 11,132,496 B2
(45) Date of Patent: Sep. 28, 2021

(54) ELECTRONIC BOOK DISPLAY DEVICE, ELECTRONIC BOOK DISPLAY METHOD, AND PROGRAM

(71) Applicant: RAKUTEN GROUP, INC., Tokyo (JP)

(72) Inventors: Rong Liu, Tokyo (JP); Junichi Harada, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 16 days.

(21) Appl. No.: 15/740,334

(22) PCT Filed: Jul. 10, 2015

(86) PCT No.: PCT/JP2015/069951
§ 371 (c)(1),
(2) Date: Dec. 27, 2017

(87) PCT Pub. No.: WO2017/009908
PCT Pub. Date: Jan. 19, 2017

(65) Prior Publication Data
US 2018/0329872 A1 Nov. 15, 2018

(51) Int. Cl.
*G06F 40/114* (2020.01)
*G06F 3/14* (2006.01)
(Continued)

(52) U.S. Cl.
CPC .......... *G06F 40/114* (2020.01); *G06F 3/0483* (2013.01); *G06F 3/14* (2013.01); *G09G 5/022* (2013.01)

(58) Field of Classification Search
USPC ................ 715/201, 202, 230, 255
See application file for complete search history.

(56) References Cited

U.S. PATENT DOCUMENTS 8,923,839 B2    12/2014 Park
2004/0080541 A1*    4/2004 Saiga ............... G06F 3/0485
                                                715/805
(Continued)

FOREIGN PATENT DOCUMENTS

CA        2862841 A1    7/2013
CA        2847150 A1    1/2014
(Continued)

*Primary Examiner* — Kavita Stanley
*Assistant Examiner* — Jenq-Kang Chu
(74) *Attorney, Agent, or Firm* — HEA Law PLLC

(57) ABSTRACT

While reducing memory usage, page related data is made available. Data obtaining means (101) of an electronic book display device (1) obtains electronic book data including a plurality of pages stored in storing means (100) for storing the electronic book data. Display controlling means (103) displays, on display means (14), one or more pages specified in the plurality of pages based on the electronic book data obtained by the data obtaining means (101). Page related data generating means (104) generates, before the display means (14) displays at least one of preceding and succeeding pages to the one or more pages displayed on the display means (14), page related data based on the at least one of the pages and writes the generated page related data in the storing means (100).

20 Claims, 27 Drawing Sheets

(51) Int. Cl.
　　　*G06F 3/0483* 　　(2013.01)
　　　*G09G 5/02* 　　(2006.01)

(56) References Cited

U.S. PATENT DOCUMENTS

| | | | | |
|---|---|---|---|---|
| 2008/0079972 A1* | 4/2008 | Goodwin | ............... | G09G 5/346 358/1.12 |
| 2008/0154779 A1* | 6/2008 | Kunimatsu | ............ | G06Q 30/02 705/52 |
| 2009/0041352 A1* | 2/2009 | Okamoto | .............. | G06F 40/103 382/176 |
| 2012/0304053 A1* | 11/2012 | Yamaguchi | ........... | G06F 1/1677 715/251 |
| 2014/0298164 A1* | 10/2014 | Terayoko | .............. | G06F 40/103 715/243 |
| 2015/0356059 A1* | 12/2015 | Tomoda | ................ | G06F 3/0483 715/273 |

FOREIGN PATENT DOCUMENTS

| | | |
|---|---|---|
| JP | 2007-241942 A | 9/2007 |
| JP | 4818415 B2 | 11/2011 |
| JP | 2012-221316 A | 11/2012 |

\* cited by examiner

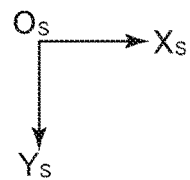
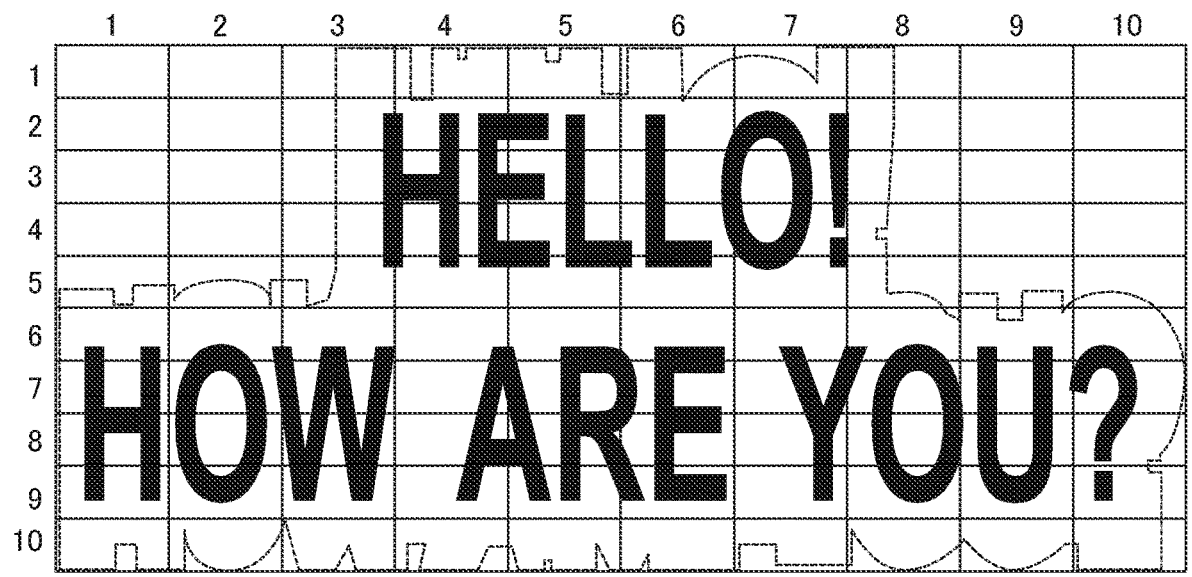
FIG.15

ELECTRONIC BOOK DISPLAY DEVICE, ELECTRONIC BOOK DISPLAY METHOD, AND PROGRAM

CROSS REFERENCE TO RELATED APPLICATIONS

This application is a National Stage of International Application No, PCT/JP2015/069951 filed on Jul. 10, 2015. The contents of the above document is incorporated herein by reference in its entirety.

TECHNICAL FIELD

The present invention relates to an electronic book display device, an electronic book display method, and a program.

BACKGROUND ART

There are known techniques for generating page related data about each page based on electronic book data including a plurality of pages. For example, Patent Literature 1 describes techniques for extracting page related data of positions and orders of frames and balloons in each page prior to selling electronic book data of comics having multiple pages, and selling the page related data with image data of the comics so as to be stored in a memory of a terminal of a user.

CITATION LIST

Patent Document

Patent Literature 1: Japanese Patent No. 4818415

SUMMARY OF INVENTION

Technical Problem

In Patent Literature 1, for example, not only the image data but also the page related data of the electronic book needs to be downloaded and stored in the memory of the user's terminal, which leads to large memory consumption.

One or more embodiments of the present invention have been conceived in view of the above, and an object thereof is to make page related data available while reducing memory usage.

Solution to Problem

In order to solve the above described problems, an electronic book display device according to the present invention includes data obtaining means for obtaining electronic book data including a plurality of pages stored in storing means for storing the electronic book data, display controlling means for displaying, on display means, one or more pages specified in the plurality of pages based on the electronic book data obtained by the data obtaining means, and page related data generating means for, before the display means displays at least one of preceding and succeeding pages to the one or more pages displayed on the display means, generating page related data based on the at least one of the pages and writing the generated page related data in storing means.

An electronic book display method according to the present invention includes a data obtaining step for obtaining electronic book data including a plurality of pages stored in storing means for storing the electronic book data, a display controlling step for displaying, on display means, one or more pages specified in the plurality of pages based on the electronic book data obtained in the data obtaining step, and a page related data generating step for, before the display means displays at least one of preceding and succeeding pages to the one or more pages displayed on the display means, generating page related data based on the at least one of the pages and writing the generated page related data in storing means.

A program according to the present invention that causes a computer to function as data obtaining means for obtaining electronic book data including a plurality of pages stored in storing means for storing the electronic book data, display controlling means for displaying, on display means, one or more pages specified in the plurality of pages based on the electronic book data obtained by the data obtaining means, and page related data generating means for, before the display means displays at least one of preceding and succeeding pages to the one or more pages displayed on the display means, generating page related data based on the at least one of the pages and writing the generated page related data in storing means.

An information storage medium according to the present invention is a computer-readable information storage medium storing the program.

In an aspect of the present invention, before the at least one of the pages is displayed on the display means, the page related data generating means extracts one or more character region candidates in the at least one of the pages to generate and write the page related data. The electronic book display device further includes receiving means for receiving specifying operation of the character region candidate when the display means displays the at least one of the pages, and post-operation character determination means for determining, after the receiving means receives the specifying operation, whether the character region candidate specified by the specifying operation includes a character. The display control means expands and displays an inside of the character region candidate that is determined by the post-operation character determination means as including a character.

In an aspect of the present invention, the electronic book display device further includes pre-operation character determination means for performing first character determination processing on the character region candidate before the receiving means receives the specifying operation. When the specifying operation specifies the character region candidate that is determined by the pre-operation character determination means as including a character, the post-operation character determination means performs second character determination processing that has higher accuracy than the first character determination processing.

In an aspect of the present invention, if a number of the character region candidates in the at least one of the pages is less than a reference value, the page related data generating means further extracts one or more character region candidates in a page subsequent to the at least one of the pages to generate and write page related data.

In an aspect of the present invention, the electronic book display device further includes size determination means for determining whether a size of a contour of the character region candidate or a size of the character region candidate is equal to or more than a reference size. The post-operation character determination means does not perform determination on the character region candidate that is determined by the size determination means as having a size less than the reference size, and determines whether a character is included in the character region candidate that is determined by the size determination means as having the reference size or more.

In an aspect of the present invention, the page related data generating means includes at least one of means for extracting the character region candidate in an upper region of the at least one of the pages and not extracting the character region candidate in a lower region of the at least one of the page and means for extracting the character region candidates in a reading order of one or more character regions in the at least one of the pages until a number of the character region candidates reaches the reference value.

In an aspect of the present invention, before the at least one of the pages is displayed on the display means, the page related data generating means extracts the character regions in the at least one of the pages to generate and write the page related data. The electronic book display device further includes receiving means for receiving specifying operation of the character region when the at least one of the pages is displayed on the display means. When the receiving means receives the specifying operation, the display control means expands and displays an inside of the character region specified by the specifying operation.

In an aspect of the present invention, the page related data generating means includes means for extracting the character region candidate in the at least one of the pages before the at least one of the pages is displayed on the display means, and determines whether the character region candidate includes a character to extract the character region.

In an aspect of the present invention, the page related data generating means performs first character determination processing on the character region candidate before the at least one of the pages is displayed on the display means, and extracts the character region by performing second character determination processing on the character region candidate that is determined by the first character determination processing as including a character, the second character determination processing having higher accuracy than the first character determination processing.

In an aspect of the present invention, the page related data generating means includes size determination means for determining whether the size of the contour of the character region candidate or the size of the character region candidate is equal to or more than the reference size, and extracts the character region by not performing determination on the character region candidate that is determined by the size determination means as having a size less than the reference size and by determining whether the character region candidate that is determined by the size determination means as having the reference size or more includes a character.

In an aspect of the present invention, if the number of the character regions in at least one of the pages is less than the reference value, the page related data generating means extracts one or more character regions in a page subsequent to the at least one of the pages to generate and write page related data.

In an aspect of the present invention, the page related data generating means includes at least one of means for extracting the character region in the upper region of the at least one of the pages and not extracting the character region in the lower region of the at least one of the pages, and means for extracting the character regions in a reading order of the character regions in the at least one of the pages until a number of the character regions reaches a reference value.

In an aspect of the present invention, the electronic book display device further includes means for obtaining history data stored in means for storing the history data, which relates to a history of the specifying operation by a user of the electronic book display device. The page related data generating means includes frequency determination means for determining whether frequency of the specifying operation by the user is equal to or more than a reference value based on the history data, and generates and writes the page related data when the frequency determination means determines that the frequency is equal to or more than the reference value.

In an aspect of the present invention, the electronic book display device further includes means for obtaining page data stored in means for storing the page data, which relates to a page on which the specifying operation is performed by the user of the electronic book display device. The page related data generating means includes previous determination means for determining whether the specifying operation has been performed by the user on the at least one of the pages based on the page data, and generates and writes the page related data when the previous determination means determines that the specifying operation has been performed.

In an aspect of the present invention, the electronic book display device further includes means for obtaining page data stored in the means for storing page data of a page on which specifying operation is performed by a user other than the user of the electronic book display device. The page related data generating means includes the previous determination means that determines whether specifying operation has been performed on the at least one of the pages by the other user based on the page data, and generates and writes page related data when the previous determination means determines that the specifying operation has been performed.

In an aspect of the present invention, the electronic book display device further includes means for obtaining age information about an age of the user of the electronic book display device. The page related data generating means includes age determining means for determining whether the age of the user is equal to or more than a reference age based on the age information, and generates and writes the page related data when the age determining means determines that the age of the user is equal to or more than the reference age.

In an aspect of the present invention, the electronic book display device further includes means for obtaining size information relating to a screen size of the display means. The page related data generating means includes size determination means for determining whether the screen size of the display means is less than a reference size based on the size information, and generates and writes the page related data when the size determination means determines the screen size of the display means is less than the reference size.

Advantageous Effects of Invention

According to the present invention, it is possible to make page related data available while reducing memory usage.

BRIEF DESCRIPTION OF DRAWINGS

FIG. 15 is a diagram for explaining character determination processing using learning data;

DESCRIPTION OF EMBODIMENTS

1. Embodiment 1

Embodiments of the present invention will be described below in detail with reference to the accompanying drawings.

[1-1. Hardware Configuration of Electronic Book Display Device]

Figure 1:
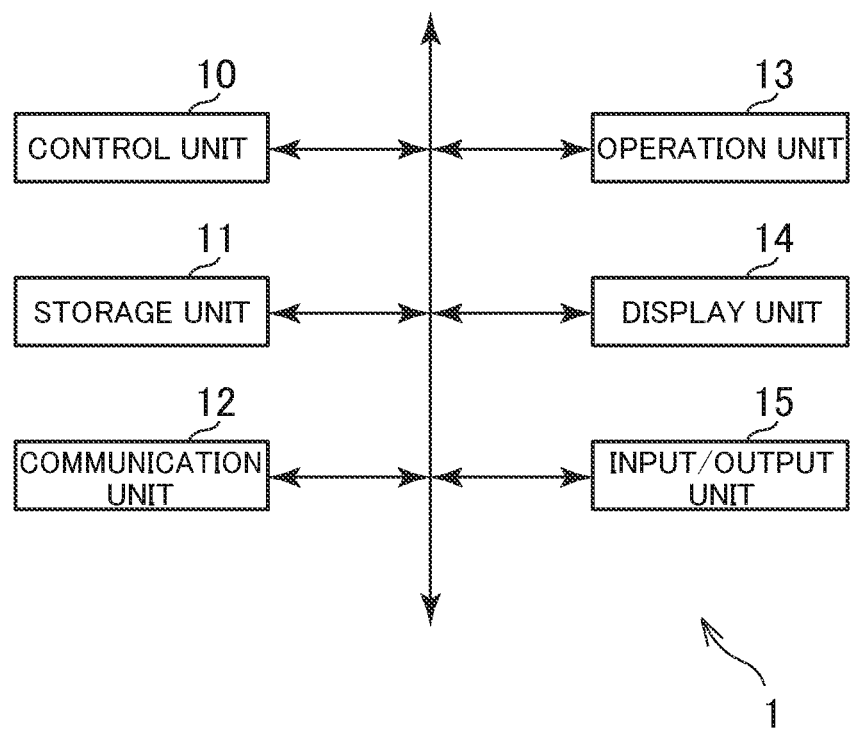
FIG. 1 is a diagram illustrating hardware configuration of an electronic book display device in this embodiment.

FIG. 1 is a diagram illustrating hardware configuration of an electronic book display device in this embodiment. The electronic book display device 1 is a computer operated by a user, such as a mobile phone (including smartphone), a mobile information terminal (including tablet computer), an electronic book reader, and a personal computer. As shown in FIG. 1, the electronic book display device 1 includes a control unit 10, a storage unit 11, a communication unit 12, an operation unit 13, a display unit 14, and an input/output unit 15.

The control unit 10 includes, for example, one or more microprocessors. The control unit 10 executes processing according to a program or data stored in the storage unit 11. The storage unit 11 includes a main storage unit and an auxiliary storage unit. For example, the main storage unit is a RAM, and the auxiliary storage unit is a hard disk drive or a solid state drive. The communication unit 12 is a communication interface, such as a network card.

The operation unit 13 is a general input device including a touch panel or a pointing device, such as a mouse. The operation unit 13 sends an operation of a user to the control unit 10. The display unit 14 is, for example, a liquid crystal display unit or an organic EL display unit. The display unit 14 displays a screen according to an instruction from the control unit 10. The input/output unit 15 is an input/output interface for inputting/outputting data to/from external devices. For example, the input/output unit 15 reads data and programs from a computer-readable information storage medium (e.g., optical disc and memory card).

The programs and the data, which are described as being stored in the storage unit 11, may be supplied to the storage unit 11 from a server computer connected to the network through the communication unit 12, or from an information storage medium through the input/output unit 15. The hardware configuration of the electronic book display device 1 is not to be limited to the above described example, and various types of computer hardware may be applicable.

[1-2. Functions Implemented in Electronic Book Display Device]

Figure 2:
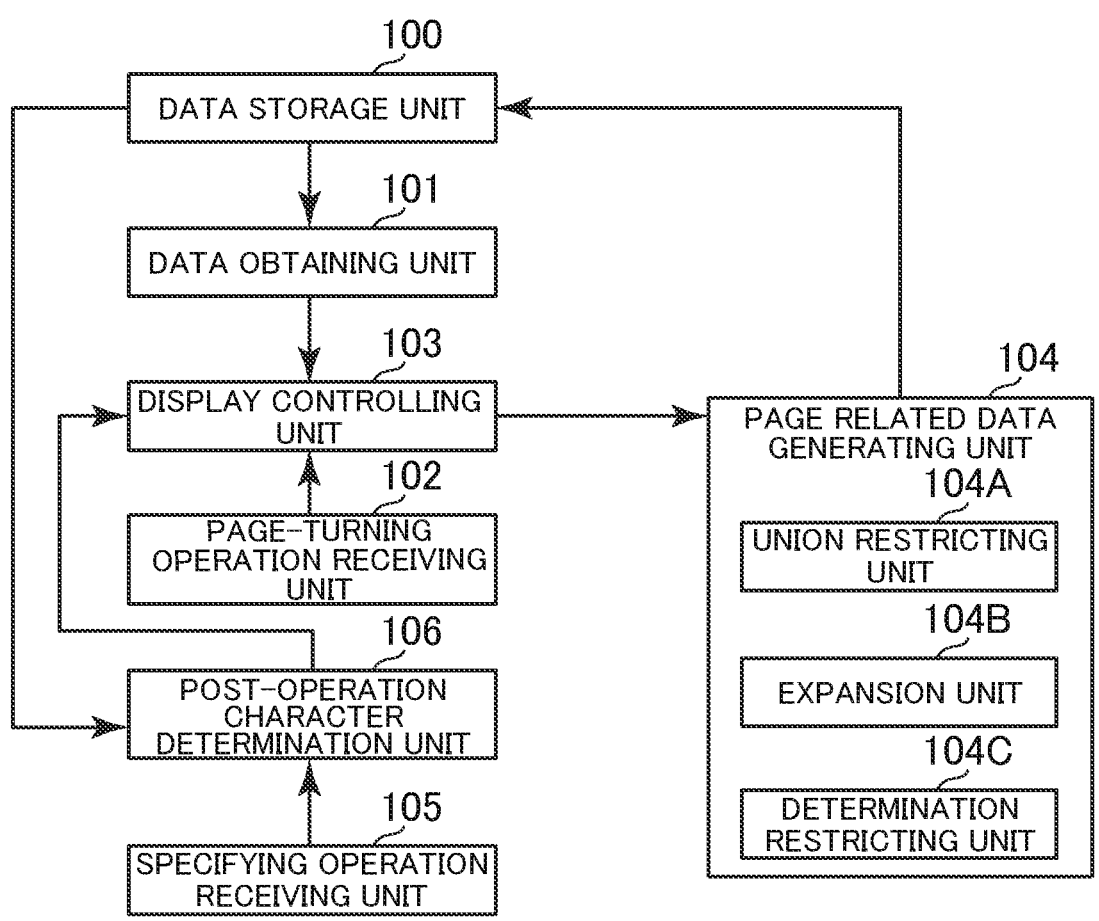
FIG. 2 is a functional block diagram illustrating an example of functions implemented in the electronic book display device.

FIG. 2 is a functional block diagram illustrating an example of functions implemented in the electronic book display device 1. As shown in FIG. 2, the electronic book display device 1 implements a data storage unit 100, a data obtaining unit 101, a page-turning operation receiving unit 102, a display controlling unit 103, a page related data generating unit 104, specifying operation receiving unit 105, and a post-operation character determination unit 106. The data storage unit 100 is implemented mainly by the storage unit 11, and other functions are implemented mainly by the control unit 10.

[1-2-1. Data Storage Unit]

Figure 3:
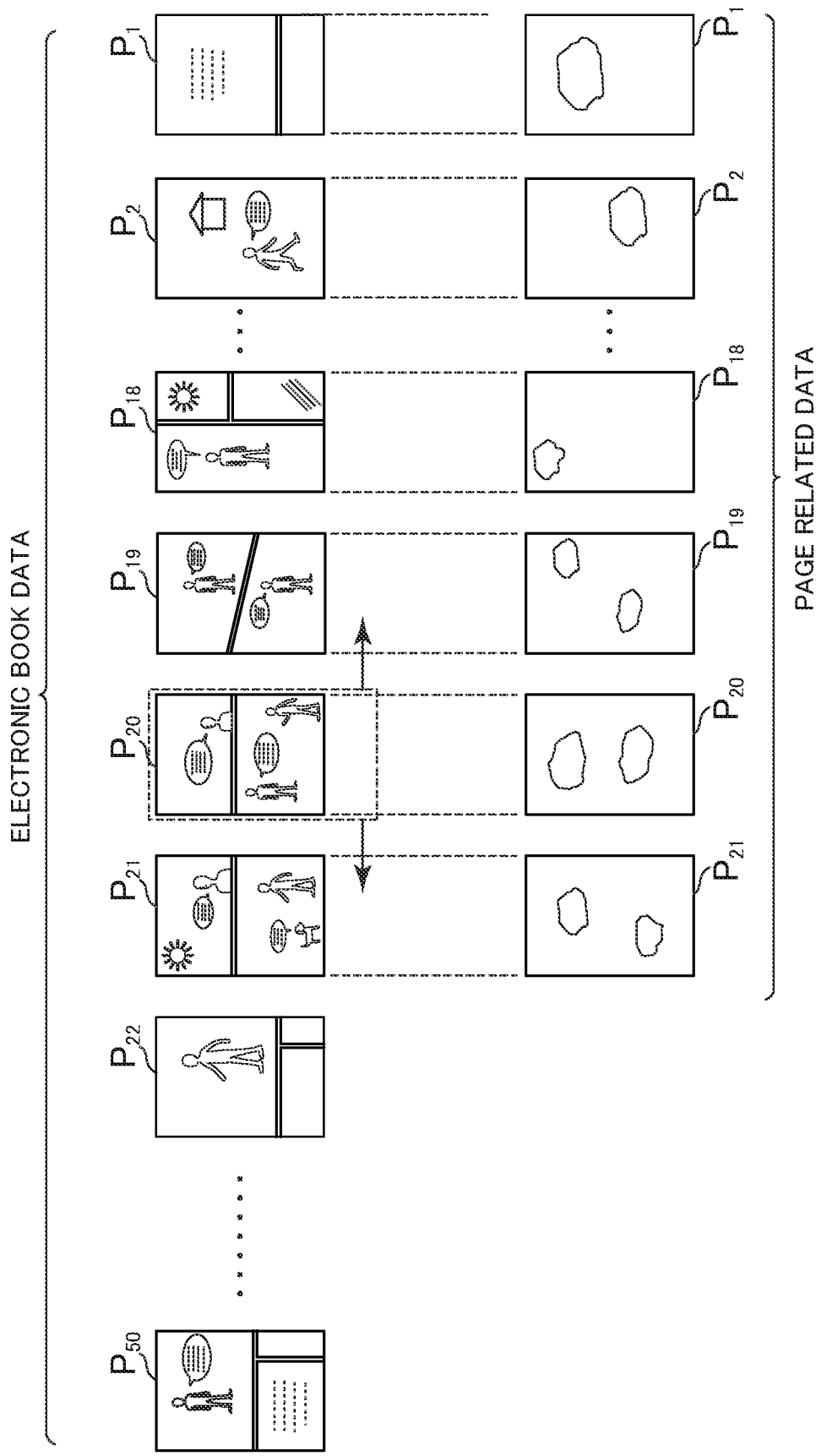
FIG. 3 is a diagram illustrating an example of the electronic book data.

The data storage unit 100 stores electronic book data of multiple pages. FIG. 3 is a diagram illustrating an example of the electronic book data. As shown in FIG. 3, in this embodiment, each page of an electronic book has a sign such as "$P_N$." "N" of "$P_N$" is a natural number and represents a page number. The electronic book shown in FIG. 3 has 50 pages, and thus N has values from 1 to 50. For example, page $P_{20}$ indicates the 20th page, and page $P_{21}$ indicates the 21th page.

The electronic book may be any book electronically displayed on the display unit 14, for example, comics, picture books, and magazines. The electronic book at least includes characters. Other than characters, the electronic book may include, for example, pictures, photographs, and graphics. Here, the pictures are not limited to be drawings that are drawn by human hand and read by a scanner to be digitized, but also include CG drawn by human using a computer. The data format of the electronic book data may be a data format used in electronic books in general.

The electronic book data includes image data of each page $P_N$. Each page $P_N$ may have image data, or there may be collective image data in which all pages $P_N$ are put together. The electronic book may be in color, monochrome, or grayscale. The electronic book data may include additional data attached to the image data. The additional data is, for example, a page number of each page and date of issue. In this embodiment, comics of multiple pages represented in gray-scale will be described as an example of the electronic book.

The data storage unit 100 may store data other than the electronic book data. For example, the data storage unit 100 may store an application of electronic book reader (viewer application). For example, the data storage unit 100 may store learning data for character determination described later.

[1-2-2. Data Obtaining Unit]

The data obtaining unit 101 obtains electronic book data stored in the data storage unit 100 that stores the electronic book data of pages $P_N$. As described above, the electronic book data includes the image data. The data obtaining unit 101 may obtain image data of all of pages $P_N$ at a time, or obtain image data of only some of pages $P_N$. In the case where the data obtaining unit 101 obtains the image data of only some of pages $P_N$, the data obtaining unit 101 may obtain only image data of a page $P_N$ to be displayed, or obtain image data of a page $P_N$ to e displayed and preceding and succeeding pages $P_N$. The page to be displayed may be one page $P_N$, or a plurality of pages $P_N$, such as opposing pages. Further, in a case where the electronic book is comics as in this embodiment, only one frame in one page $P_N$ may be a display target. In this embodiment, a case will be described in which a page $P_N$ of the pages $P_N$ is a display target.

[1-2-3. Page-Turning Operation Receiving Unit]

The page-turning operation receiving unit 102 receives page-turning operation. The page-turning operation is operation to specify a page $P_N$ to be displayed on the display unit 14. In other words, the page-turning operation is operation for switching the pages $P_N$ displayed on the display unit 14. The page-turning operation may be predetermined operation, such as operation to select an icon displayed on the display unit 14, or flick operation if the operation unit 13 is a touch panel. In this embodiment, since the display target is one page $P_N$, the page-turning operation may be described as operation to specify one of the pages $P_N$.

[1-2-4. Display Controlling Unit]

In this embodiment, the display controlling unit 103 displays a page $P_N$ specified in the pages $P_N$ on the display unit 14 based on the electronic book data obtained by the data obtaining unit 101. The display controlling unit 103 displays, on the display unit 14, the page $P_N$ specified by the page-turning operation. For example, when the page-turning operation receiving unit 102 receives the page-turning operation, the display controlling unit 103 displays a page $P_{N+1}$, which is the page succeeding the page $P_N$ being displayed, or a page $P_{N-1}$, which is the page preceding the page being displayed, on the display unit 14.

The number of pages to be displayed may be specified by the page-turning operation. For example, while the display unit 14 displays the page $P_{20}$, the page $P_{30}$ may be specified by the page-turning operation to skip pages between $P_{21}$ to $P_{29}$. In the case where the display target is one page $P_N$ as in this embodiment, the display controlling unit 103 may display the entire page $P_N$, or only a part of the page $P_N$. When only a part of the page $P_N$ is displayed, the display controlling unit 103 displays the part indicated by a user using the operation unit 13.

[1-2-5. Page Related Data Generating Unit]

In this embodiment, before the display unit 14 displays at least one of pages $P_{N-K}$ and $P_{N+K}$ (K is a natural number), which are preceding and succeeding pages to the page $P_N$ being displayed, on the display unit 14, the page related data generating unit 104 generates page related data based on the at least one of the pages $P_{N-K}$ and $P_{N+K}$, and stores the generated data in the data storage unit 100. In this regard, the page $P_{N-K}$ is the page preceding the page $P_N$ by K pages, and the page $P_{N+K}$ is the page succeeding the page $P_N$ by K pages.

The page related data is data obtained by performing image processing on each page $P_N$. In this embodiment, a case will be described in which data indicating a character region candidate corresponds to the page related data. The character region candidate is a region to be a target of character determination. In other words, the character region candidate is a region in which a character is likely included. As such, in this embodiment, before at least one of pages $P_{N-K}$ and $P_{N+K}$ is displayed on the display unit 14, the page related data generating unit 104 extracts a character region candidate in the at least one of the pages $P_{N-K}$ and $P_{N+K}$, and generates and stores the extracted character region candidate as the page related data.

The page related data generating unit 104 may generate page related data for the pages $P_{N-K}$ preceding a certain page $P_N$, or for the pages $P_{N+K}$ succeeding the page $P_N$, or for both the pages $P_{N-K}$ and the pages $P_{N+K}$. In this embodiment, a case will be described in which the page related data generating unit 104 generates page related data for the pages $P_{N+1}$ succeeding the page $P_N$ being displayed.

For example, when the application of the electronic book reader is activated, the display controlling unit 103 displays the page $P_1$, which is the first page, on the display unit 14. The page related data generating unit 104 generates and stores page related data of the page $P_1$ before the page $P_1$ is displayed on the display unit 14. Subsequently, when the display controlling unit 103 displays the page $P_1$ on the display unit 14, the page related data generating unit 104 generates and stores page related data of the next page $P_2$ in advance before the page $P_2$ is displayed on the display unit 14. When the page-turning operation is performed and the display controlling unit 103 displays the page $P_2$, the page related data generating unit 104 generates and stores page related data of the next page $P_3$ in advance before the page $P_3$ is displayed on the display unit 14. Similarly, page related data of pages $P_4$ to $P_{50}$ is generated.

In this embodiment, a case will be described in which the data storage unit 100 keeps the page related data generated by the page related data generating unit 104 until the application of the electronic book reader terminates, although the page related data may be discarded at predetermined timing before the application terminates. For example, the page related data of a page far away from the page $P_N$ being displayed may be discarded.

Next, the processing to generate page related data will be discussed in detail. Here, a case will be described in which, when the display controlling unit 103 displays the page $P_{20}$ on the display unit 14, the page related data generating unit 104 generates page related data of the next page $P_{21}$ before the page $P_{21}$ is displayed on the display unit 14.

Figure 4:
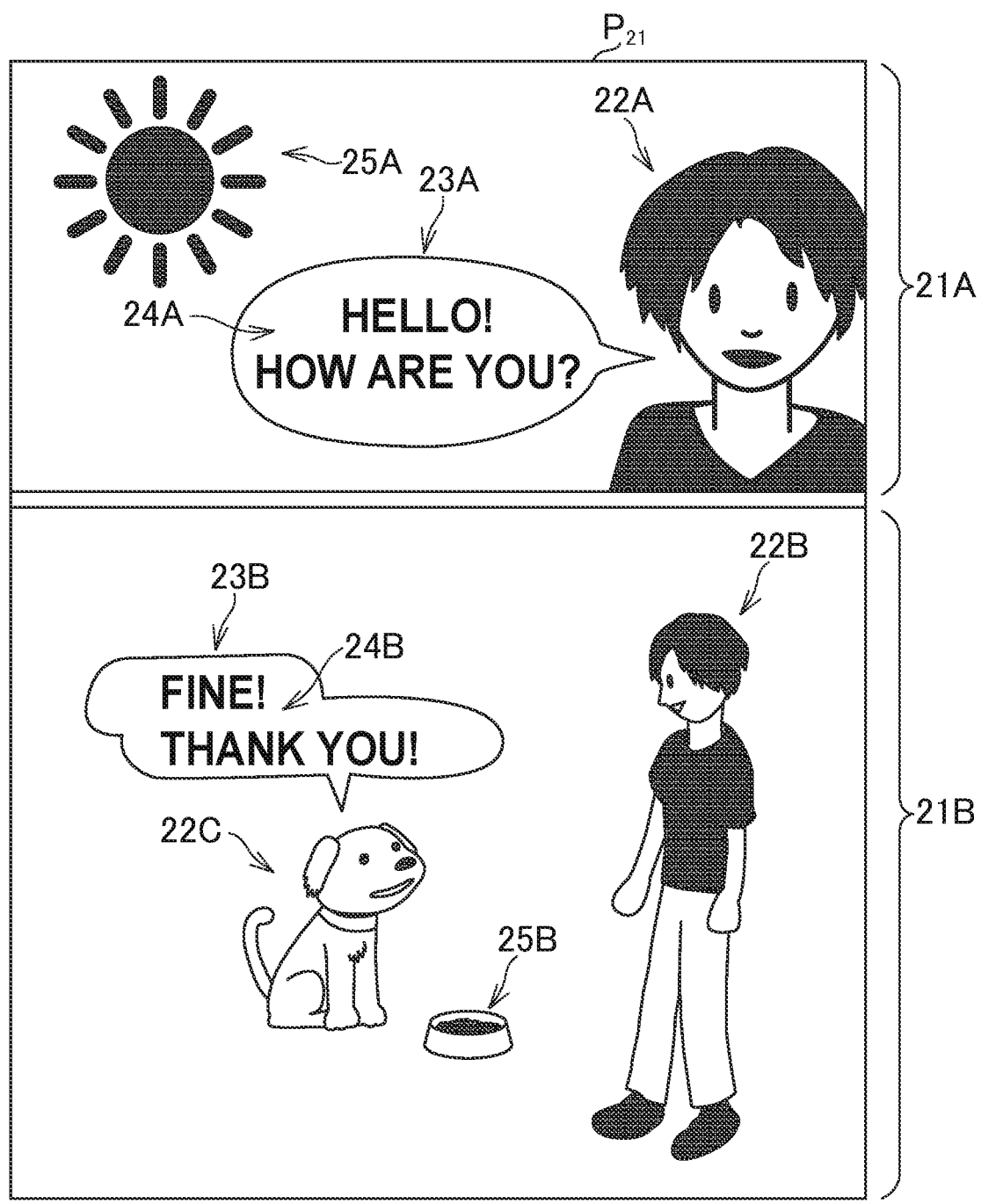
FIG. 4 is a diagram illustrating an example of a page.

FIG. 4 is a diagram illustrating an example of the page $P_{21}$. In this embodiment, comics is taken as an example of the electronic book, and thus the page $P_{21}$ includes one or more frames 21 as shown in FIG. 4. The frame 21 is a section in a page in which a picture and a character are depicted. In the example of FIG. 4, the page $P_{21}$ includes two frames 21 (also referred to as frames 21A and 21). In the example of FIG. 4, each frame 21 is enclosed, although each frame 21 may not be enclosed.

Each frame 21 includes objects such as pictures, balloons, and characters. The balloon indicates words of a character in the comics. The character is a person in the comics, and may be an animal, a robot, or a virtual creature other than human beings. The balloon includes one or more characters indicating words of the character. In the following, a group of characters will be described as a character group. In the example of FIG. 3, the frame 21A includes a character 22A, a balloon 23A, a character group 24A, and a sun 25A, and the frame 21B includes characters 22B and 22C, a balloon 23B, a character group 24B, and a dish 25B. The characters 22A to 22C, the sun 25A, and the dish 25B are examples of the pictures described above. The balloon 23A indicates the words of the character 22A, and the balloon 23B indicates the words of the character 22C.

In this embodiment, the page related data generating unit 104 includes a union restricting unit 104A, an expansion unit 104B, and a determination restricting unit 104C. As described below, the page related data generating unit 104 detects the character groups 24A and 24B in the page $P_{21}$ shown in FIG. 4 as a cluster of characters, thereby generating the page related data indicating the character region candidate.

[Union Restricting Unit]

When a size of a contour of a region or the region itself is equal to or more than a reference size, the union restricting unit 104A restricts the region and a region expanded by the expansion unit 104B described later from uniting. For example, when the character group 24A expands and unites with the balloon 23A, the character group 24A cannot be detected as a cluster of characters. As such, the union restricting unit 104A prevents such a union in a way as described below, thereby increasing accuracy of the detection of the character group 24A.

The region is a part (pixel) in the page $P_{21}$ where an object is depicted, and a part having a color (e.g., black or gray) other than a background color (e.g., white). For example, the parts where objects, such as the characters 22A to 22C, the balloons 23A and 23B, the character groups 24A and 24B, the sun 25A, and the dish 25B, are depicted correspond to the regions in this embodiment. The object is an object depicted in the page $P_{21}$ other than the background part.

The contour is a frame of the region, and in this embodiment, something represented by the electronic book display device 1 as a line is described as a contour line. The region is also described as a part inside a contour, or a part between contours. For example, in a case of the character group 24A, the inside of the contour of the character "L" is a region, and a part of the character "O" between the outer contour and the inner contour is a region.

The size of a contour may be represented by, for example, the width, length, or inner size of the contour. In this embodiment, a size of a bounding rectangle of the contour is used as a size of the contour. The size of a region may be, for example, the width of the region. In this embodiment, the size of the bounding rectangle of the region is used as the size of the region.

Figure 5:
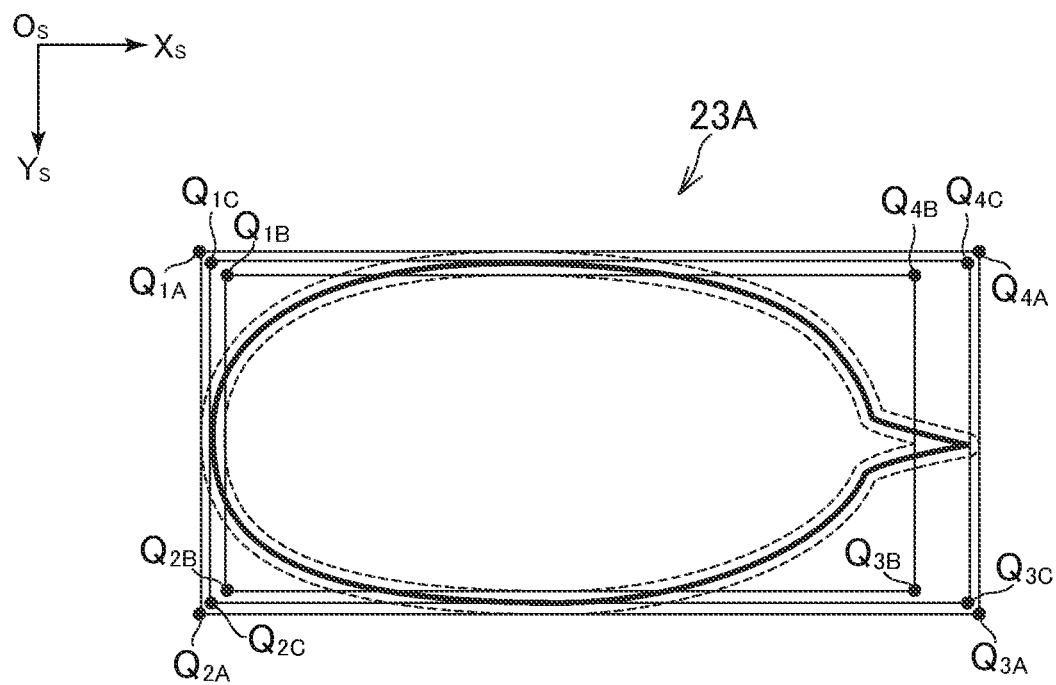
FIG. 5 is a diagram explaining sizes of a contour and a region.

FIG. 5 is a diagram explaining sizes of a contour and a region. In FIG. 5, an Xs-axis and a Ys-axis are coordinate axes in a screen coordinate system. Here, the balloon 23A is taken as an example of the region to explain the size of the contour of the balloon 23A and the size of the balloon 23A itself. In FIG. 5, the outer contour line and the inner contour line of the balloon 23A are drawn by a dashed line, and the balloon 23A is drawn by a solid line. In FIG. 5, for convenience of explanation, there are gaps between the solid line and the dashed lines, although there is no gap between these lines.

For example, the bounding rectangle of the contour line is a region between the minimum and maximum values of the Xs coordinate, and also between the minimum and maximum values of the Ys coordinate of the contour line. In the example shown in FIG. 5, the bounding rectangle of the outer contour line is a rectangle having points $Q_{1A}$ to $Q_{4A}$ as vertexes, and thus the size of this rectangle corresponds to the size of the outer contour line. The bounding rectangle of the inner contour line is a rectangle having points $Q_{1B}$ to $Q_{4B}$ as vertexes, and thus the size of this rectangle corresponds to the size of the inner contour line.

For example, the bounding rectangle of the balloon 23A is a region between the minimum and maximum values of the Xs coordinate, and also between the minimum and maximum values of the Ys coordinate of the pixels of the balloon 23A. The bounding rectangle of the balloon 23A is a rectangle having points $Q_{1C}$ to $Q_{4C}$ as vertexes, and thus the size of this rectangle corresponds to the size of the balloon 23A itself.

The union restricting unit 104A may use either one of the size of the contour and the size of the region. In this embodiment, a case will be explained in which the size of the contour is used. The union restricting unit 104A extracts a bounding rectangle of a contour of each of the regions in the page $P_{21}$, and determines a size of each bounding rectangle is equal to or greater than the reference size. A value indicating the size may use at least one of a vertical width and a horizontal width of a bounding rectangle, or a size of a bounding rectangle. Alternatively, for example, a length of a diagonal line of a bounding rectangle may be used as a value indicating the size. In this embodiment, a case will be described in which both of a vertical width and a horizontal width of a bounding rectangle are used as values indicating the size.

A threshold value $T_1$ indicating a reference of a size may be a fixed value, or a variable value. If the threshold value $T_1$ is a fixed value, the data storage unit 100 stores such a value, and if the threshold value $T_1$ is a variable value, such a value is calculated based on the values stored in the data storage unit 100. In this embodiment, a case will be described in which the threshold value $T_1$ is a fixed value. For example, the union restricting unit 104A determines whether each of the vertical width and the horizontal width of the bounding rectangle is equal to or greater than the threshold value $T_1$, thereby determining whether a size of each contour is equal to or greater than the reference size.

In this embodiment, a case will be described in which, when a size of a contour of a region is equal to or greater than the reference, the union restricting unit 104A fills the region with the background color, thereby restricting the region from uniting with a region expanded by the expansion unit 104B described below. The background color is a predetermined color specified for an image, and, for example, a color that occupies a largest part of the image. For example, the background color is white or black. In this embodiment, union means that a region is in contact with or overlaps another region to make one region.

For example, since the contour of the balloon 23A is relatively large, the union restricting unit 104A determines the contour of the balloon 23A has the size equal to or greater than the reference size, and fills the balloon 23A with the background color. This enables to prevent the balloon 23A from uniting with the character group 24A expanded by the expansion unit 104B described later. Specifically, in this embodiment, the union restricting unit 104A fills the regions such as the balloon 23A by executing (1) binarization reversal processing, (2) contour extracting processing, (3) contour line expanding processing, and (4) expanded contour line superimposing processing, as described below.

[Binarization Reversal Processing]

Figure 6:
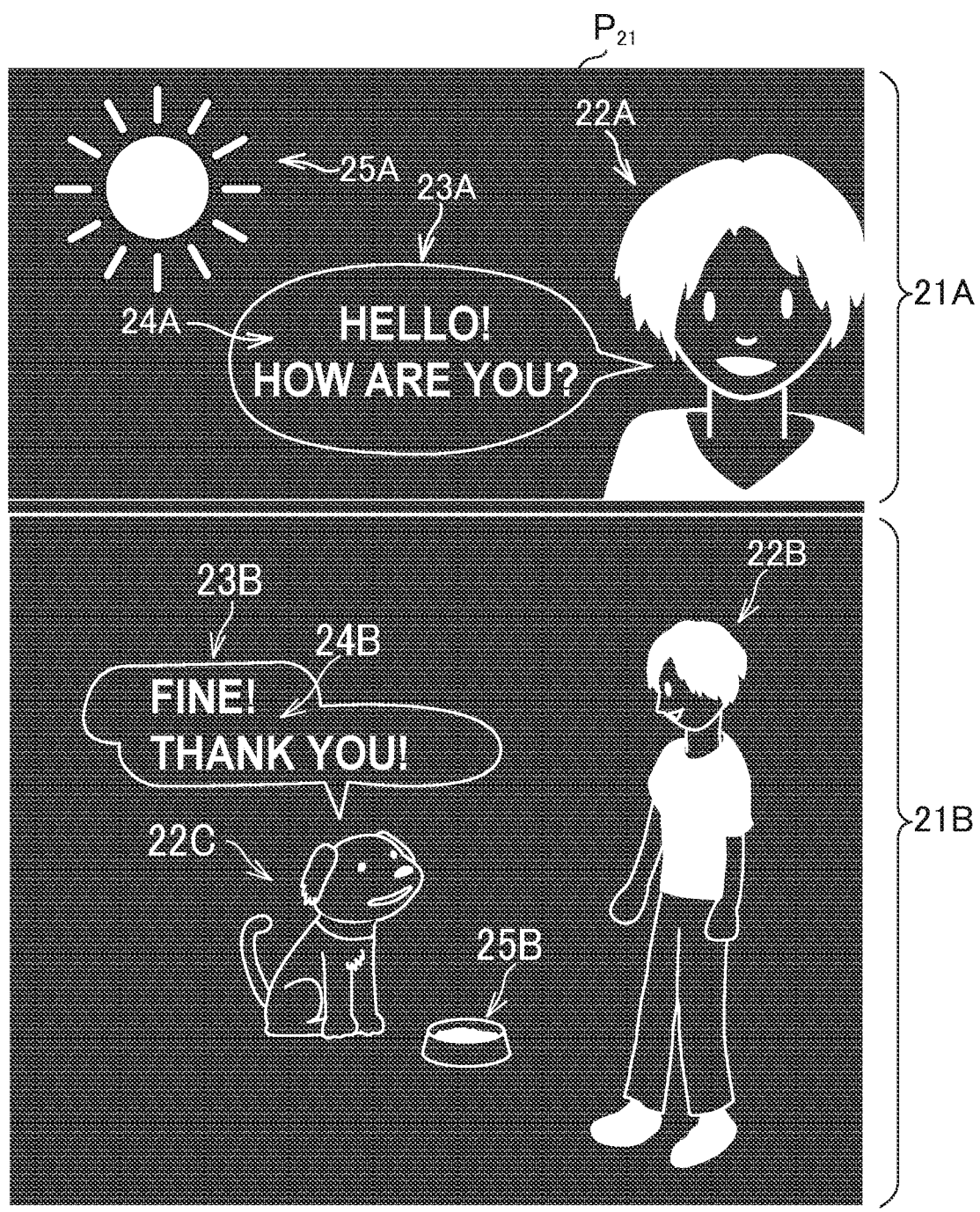
FIG. 6 is a diagram illustrating a binarized and reversed page.

First, the union restricting unit 104A performs binarization processing and reversal processing on the page $P_{21}$. FIG. 6 is a diagram illustrating the binarized and reversed page $P_{21}$. The union restricting unit 104A performs the binarization processing based on pixel values and threshold values of respective pixels of the page $P_{21}$ shown in FIG. 3, and sets each pixel to white or black. Various known algorithms may be used for the binarization processing. For example, a threshold value may be determined by using the P-tile method or the mode method. The union restricting unit 104A reverses pixel values of the respective binarized pixels, and sets the white pixels to black and the black pixels to white. This sets the page $P_{21}$ shown in FIG. 5 to the condition shown in FIG. 6. Various known algorithms may be also used for the reversal processing. For example, the pixel values after reversal may be calculated by subtracting a current value of the pixel value from maximum value (255 in the case of 8-bit gray scale) of the pixel values of the respective colors.

[Contour Extracting Processing]

Figure 7:
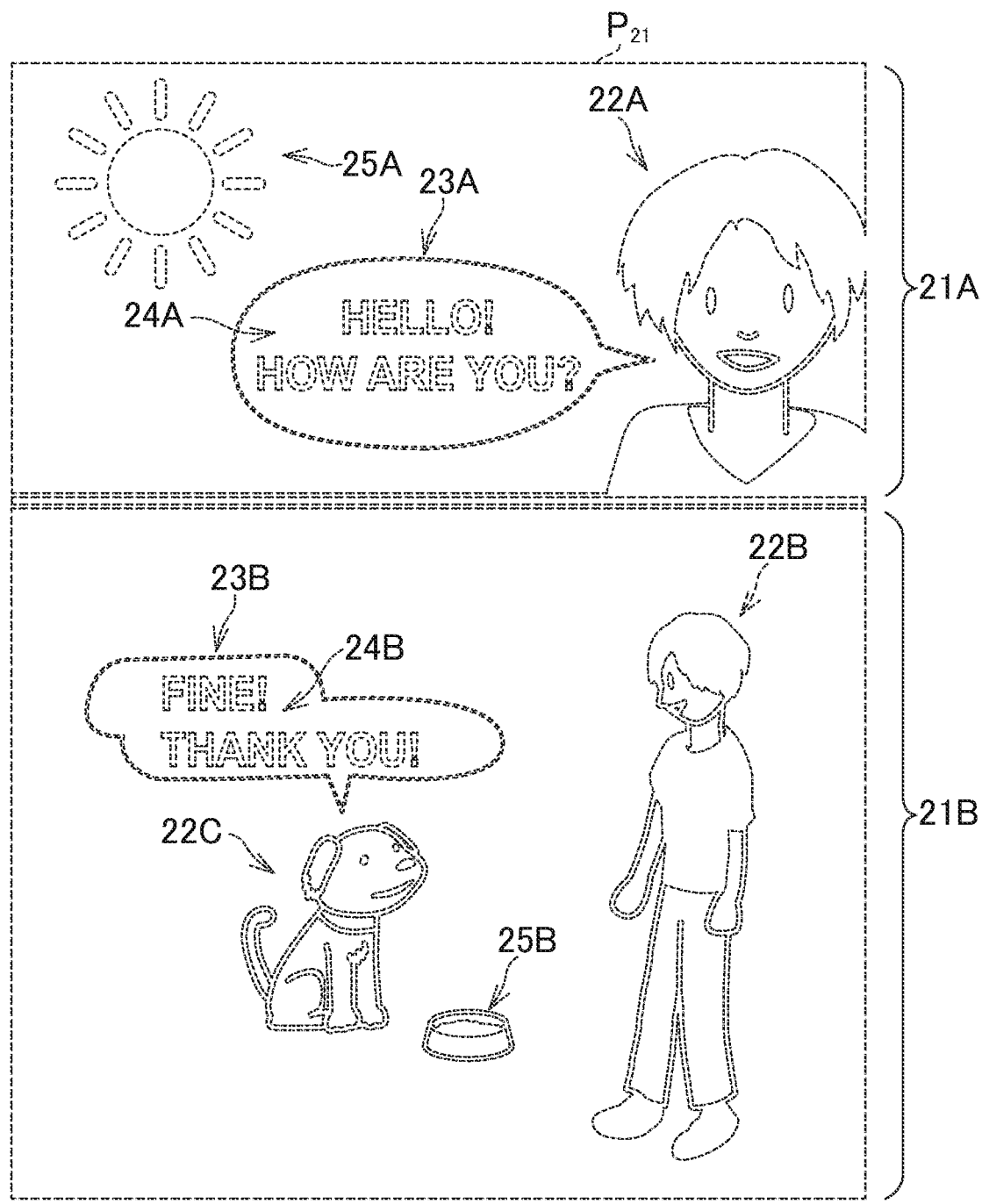
FIG. 7 is a diagram illustrating contour lines extracted from the page shown in FIG. 6.

The union restricting unit 104A performs contour extracting processing on the binarized and reversed page $P_{21}$ (FIG. 6), and extracts contours of closed regions. FIG. 7 is a diagram illustrating contour lines extracted from the page $P_{21}$ shown in FIG. 6. In FIG. 7, the contour lines extracted by the union restricting unit 104A are shown in dashed lines. The contour line may be a line having a predetermined thickness (e.g., 1 pixel). Here, the contour line is black, but may have any predetermined color. Since the balloons 23A and 23B are drawn in white in the binarized and reversed page $P_{21}$ (FIG. 6), the balloons 23A and 23B need to be filled in black, which is the background color.

Various known contour extraction algorithms may be also used for the contour extracting processing. For example, a contour of each region may be extracted by detecting edges in the image using a differential filter, a Prewitt filter, or a Sobel filter. In the page $P_{21}$ shown in FIG. 6, the left side of the head and the left shoulder of the character 22A are in contact with the contour of the frame 21A, and thus, as shown in FIG. 7, contour lines of the character 22A and the contour lines of the frame 21A are chained together.

[Contour Line Expanding Processing]

The union restricting unit 104A expands a contour line extracted by the contour extracting processing and having a size of the reference size or more. The union restricting unit 104A extracts the bounding rectangles of the respective contour lines, and determines whether a size of each of the bounding rectangles is equal to or greater than the threshold value $T_1$. As described above, in this embodiment, the vertical width and the horizontal width of the bounding rectangle are used as a size. As such, the union restricting unit 104A determines whether the vertical width and the horizontal width of the bounding rectangle each are equal to or greater than the threshold value $T_1$, thereby determining whether a size of each contour line has the reference size or more.

The union restricting unit 104A expands the contour line of the reference size or more. To expand the contour line is to thicken the contour line. The extent to which the contour line is expanded (the number of pixels to thicken the line) may be a fixed value or a variable value. If it is a fixed value, the data storage unit 100 stores such a value, and if it is a variable value, such a value is calculated based on the values stored in the data storage unit 100. For example, the union restricting unit 104A may calculate the extent of expansion of a contour line based on the position and the size of the contour line. In this case, when a contour line is positioned closer to the center of the image, the probability that such a contour line is a contour line of the balloon 23A or the balloon 23B is increased. As such, the extent of expansion of the contour line may be increased so as to fill in the region more surely. Further, for example, when a contour line is larger, the probability that such a contour line is a contour line of the balloon 23A or the balloon 23B is high. As such, the extent of expansion of the contour line may be increased so as to fill in the region more surely. In this embodiment, a case will be described in which the extent of expansion is a fixed value, and a line is thickened by predetermined pixels.

Figure 8:
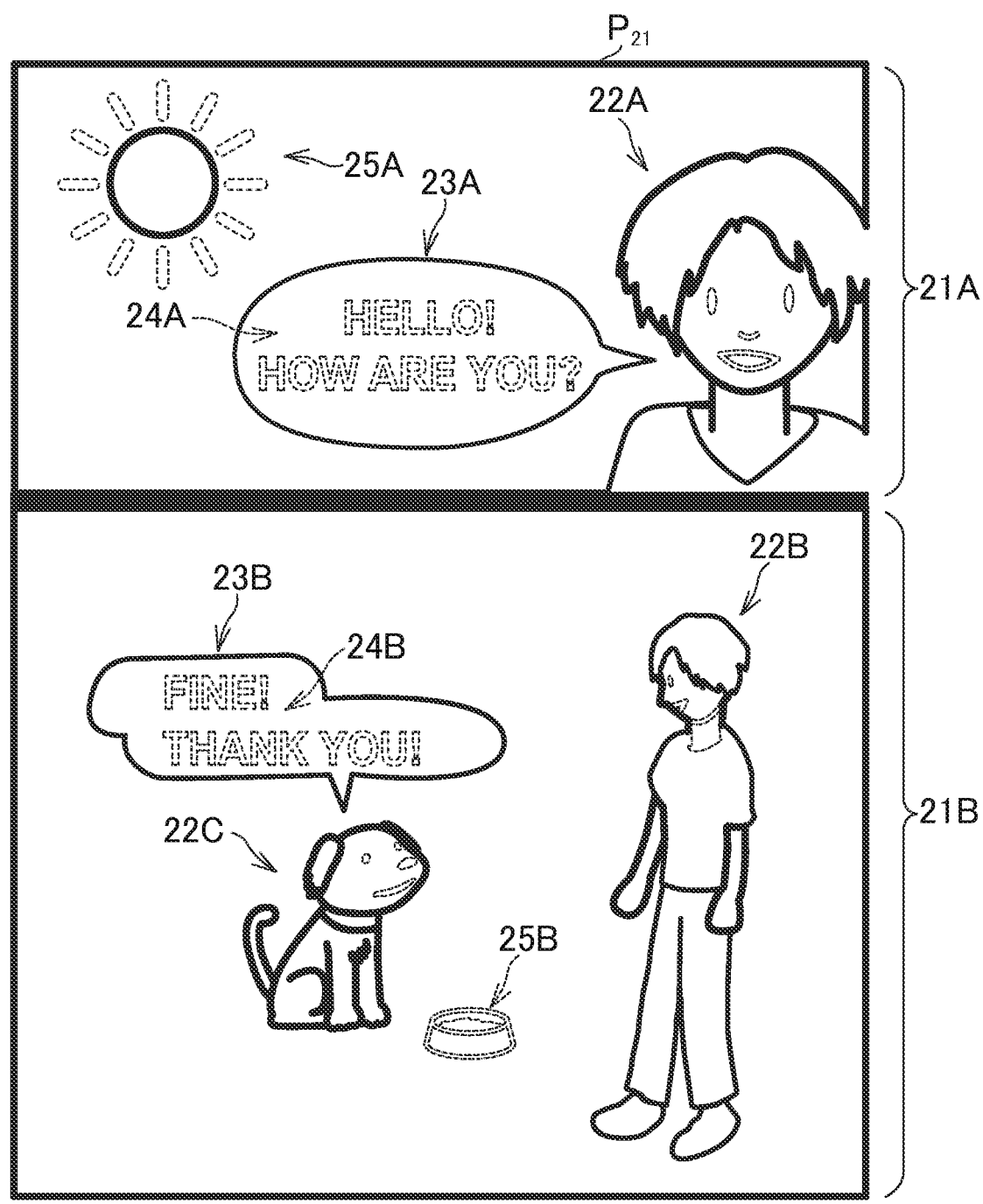
FIG. 8 is a diagram illustrating a condition of each contour line when a contour line having a reference size or more is expanded.

FIG. 8 is a diagram illustrating a condition of each contour line when a contour line having the reference size or more is expanded. In the example shown in FIG. 8, the contour lines of the frames 21A and 21B, the contour line of some parts of the characters 22A to 22C, the contour lines of the balloons 23A and 23B, and the contour lines of a part of the sun 25A are thickened by predetermined pixels. As shown in FIG. 8, when the union restricting unit 104A expands a contour line, sometimes nearby contour lines are united with each other and make a thick contour line. For example, in the example shown in FIG. 8, the outer contour lines and the inner contour lines of the balloons 23A and 23B are expanded respectively, and unite to each other to make one thick contour line.

[Expanded Contour Line Superimposing Processing]

Figure 9:
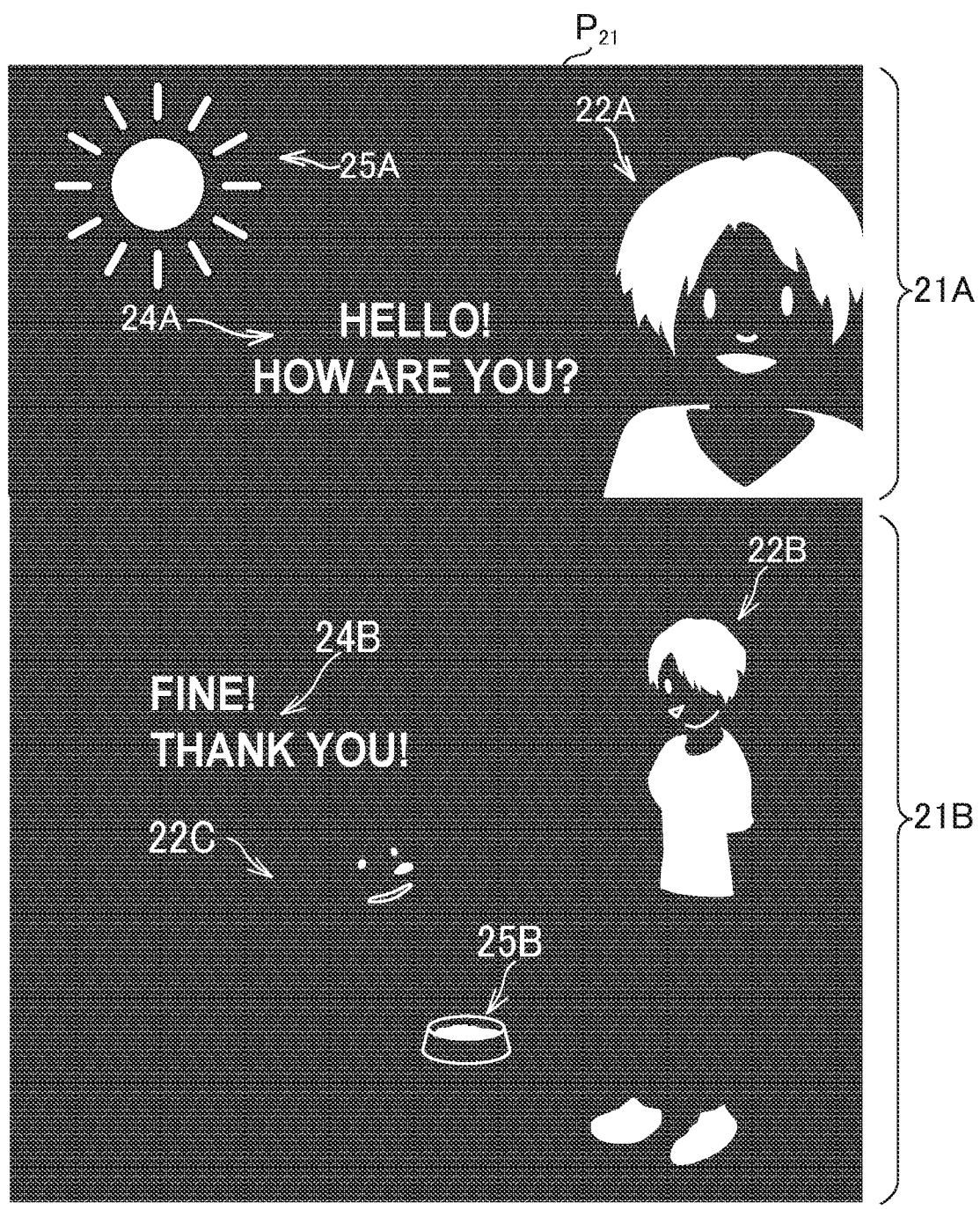
FIG. 9 is a diagram illustrating a page on which expanded contour lines are superimposed.

The union restricting unit 104A superimposes the expanded contour lines (FIG. 8) on the binarized and reversed page $P_{21}$ (FIG. 6). FIG. 9 is a diagram illustrating the page $P_{21}$ on which the expanded contour lines are superimposed. As shown in FIG. 9, the expanded contour lines forming a thick line is superimposed on each of the balloons 23A and 23B, and thus the balloons 23A and 23B are filled with black. As such, by the processing described later, even if the expansion unit 104B expands the character groups 24A and 24B, the character groups 24A and 24B do not unite with the balloons 23A and 23B.

The balloons 23A and 23B are filled with the background color as described above. The method for filling the balloons 23A and 23B with the background color is not limited to the above described method. For example, the union restricting unit 104A may select a region (e.g., balloons 23A and 23B) between the contour lines having the reference size or more, and perform the reversal processing of colors again only on the selected range. In this manner, for example, the color of balloons 23A and 23B shown in FIG. 6 return to black from white, and thus the balloons 23A and 23B can be filled with black. Alternatively, for example, the union restricting unit 104A may fill a region between the contour lines having the reference size or more where a distance between the contour lines is less than a predetermined distance with background color. Further, for example, the union restricting unit 104A may fill, with the background color, a section in which regions surrounded by the contour lines continue for a predetermined distance or more. When the above described conditions are added to the regions on which the union restricting unit 104A performs processing, the probability that the regions specified by the conditions are the parts where lines are drawn, such as the balloons 23A and 23B, is increased. As such, it is possible to more surely fill the lines such as the balloons 23A and 23B and prevent the balloons 23A and 23B from uniting with the character groups 24A and 24B.

For example, the method for preventing the balloons 23A and 23B from uniting with the character groups 24A and 24B is not limited to the method for filling the balloons 23A and 23B with the background color. For example, the union restricting unit 104A may store positions of the regions having the reference size or more (positions of pixels forming the regions) in the data storage unit 100, and, even if a region expanded by the expansion unit 104B described later is included in the pixels, not determine that such pixels are included in the regions having the reference size or more. In order not to determine that such pixels are included in the regions having the reference size or more, for example, the regions may not have the same number in the labeling processing to extract the same regions. Alternatively, for example, the union restricting unit 104A may prevent the expansion unit 104B from expanding a region in a direction of a contour line having the reference size or more. In this manner as well, for example, the character groups 24A and 24B do not expand in the direction of the balloons 23A and 23B, and thus it is possible to prevent the balloons 23A and 23B from combining with the character groups 24A and 24B.

[Expansion Unit]

The expansion unit 104B expands each of the regions in the page $P_{21}$. The expansion unit 104B may expand all of the regions in the page $P_{21}$ shown in FIG. 9, or not expand the region extracted by the union restricting unit 104A and having the contour of the reference size or more but expand the region having the contour of less than the reference size. That is, for example, the expansion unit 104B may expand only a region having a contour of less than the reference size, such as eyes, noses, and mouths of the characters 22A, 22B, and 22C, characters in the character groups 24A and 24B, a part of the sun 25A, and the dish 25B.

To expand the region means to thicken the region, and to widen an area occupied by the region. The extent of expansion of the region may be a fixed value, or a variable value. If it is a fixed value, the data storage unit 100 stores such a value, and if it is a variable value, such a value is calculated based on the values stored in the data storage unit 100. For example, the expansion unit 104B may calculate the extent of expansion of a region based on the position and the size of the region in the image. In this case, when the region positioned closer to the center of the image, the probability that the region is characters is increased. As such, the extent of expansion of the region may be increased so as to unite the region with other characters more surely. Further, when a distance between a region and another region is shorter, the probability that the region is one of characters in a character group is increased. As such, the extent of expansion of the region may be increased so as to unite the region with other characters more surely. Further, for example, when a size of a region is within a predetermined range (an area large enough to be assumed as a character), the probability that the region is a character is increased. As such, the extent of expansion of the region may be increased so as to unite the region with other characters more surely. In this embodiment, a case will be described in which the extent of expansion is a fixed value, and a region is thickened by predetermined pixels.

Figure 10:
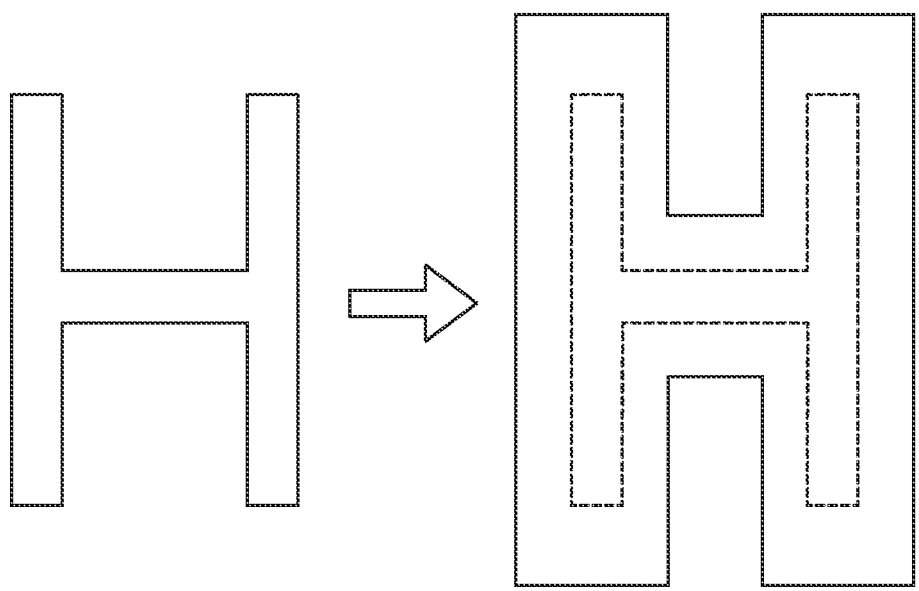
FIG. 10 is a diagram explaining processing of an expansion unit.
Figure 11:
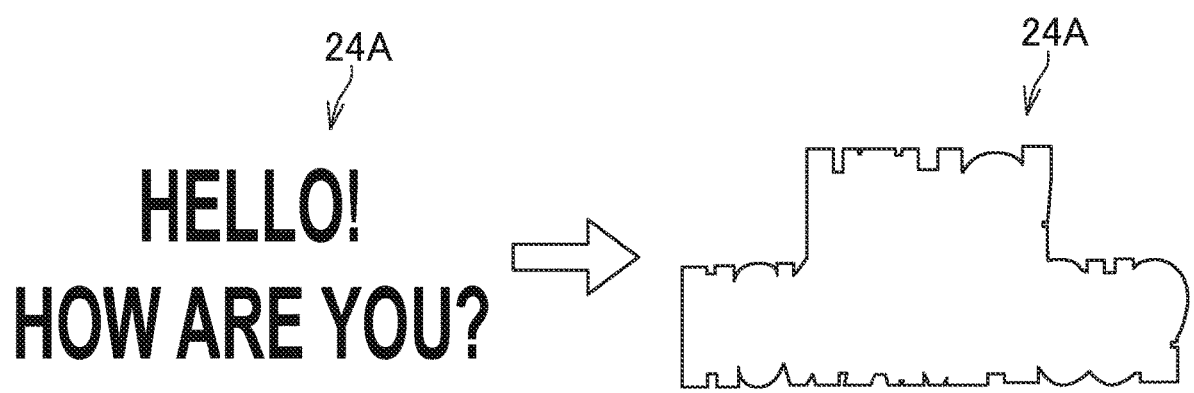
FIG. 11 is a diagram explaining processing of the expansion unit.

FIGS. 10 and 11 are diagrams explaining the processing of the expansion unit 104B. Here, a case will be taken as an example in which the expansion unit 104B expands each character in the character group 24A. For example, as shown in FIG. 10, the expansion unit 104B expands "H" by predetermined pixels. In other words, the expansion unit 104B fills pixels in a predetermined distance from "H" (i.e., pixels surrounding "H") with white. The expansion unit 104B expands characters other than "H" in "HELLO! HOW ARE YOU?" of the character group 24A by the predetermined pixels in the same way as "H." When the expansion unit 104B expands each character in the character group 24A, as shown in FIG. 11, the characters in the character group 24A are united to make one region.

Figure 12:
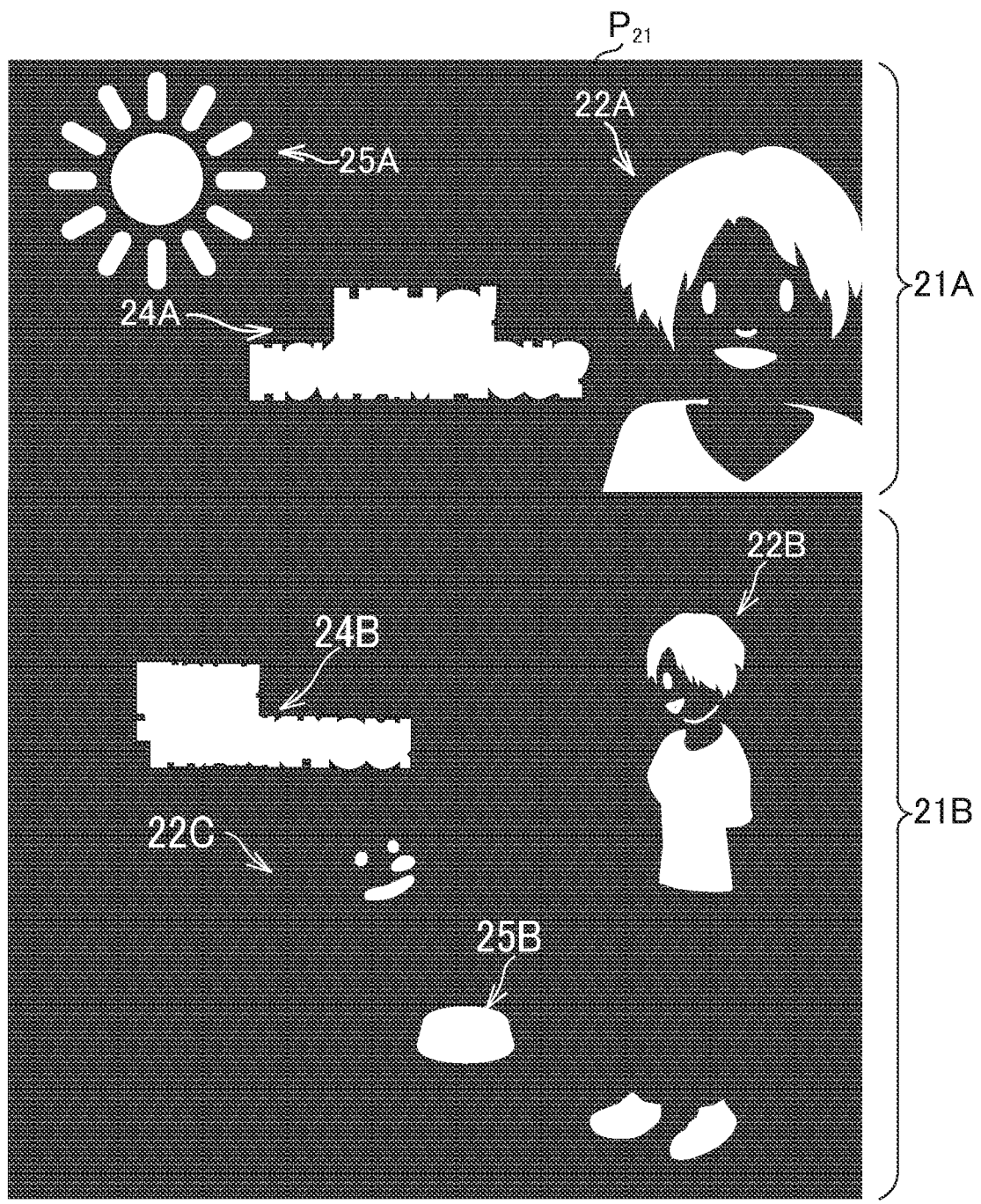
FIG. 12 is a diagram illustrating a condition after regions are expanded by the expansion unit.

FIG. 12 is a diagram illustrating a condition after the regions are expanded by the expansion unit 104B. As shown in FIG. 12, here, the regions of the characters included in the character groups 24A and 24B are expanded and united, and each make one region. In addition, for example, regions in the dish 25B and the left eye, the nose, and the mouth of the character 22C are expanded and united together. Other regions are expanded but not united because there is no neighboring region.

[Determination Restricting Unit]

If a contour of a region (FIG. 12) or the region itself expanded by the expansion unit 104B has a size less than the reference size, the determination restricting unit 104C restricts the region from being determined by the post-operation character determination unit 106. In the description of the determination restricting unit 104C, a case will be described in which a size of a contour is used in the same way as in the union restricting unit 104A.

The threshold value $T_2$ indicating the reference size may be smaller than the threshold value $T_1$. Similarly to the threshold value $T_1$, the threshold value $T_2$ may be a fixed value or a variable value. In this embodiment, a vertical width and a horizontal width of a bounding rectangle are used as a size. As such, the determination restricting unit 104C determines whether the vertical width and the horizontal width of the bounding rectangle are equal to or greater than the threshold value $T_2$, thereby determining whether the contour of the region expanded by the expansion unit 104B is less than the reference size.

Figure 13:
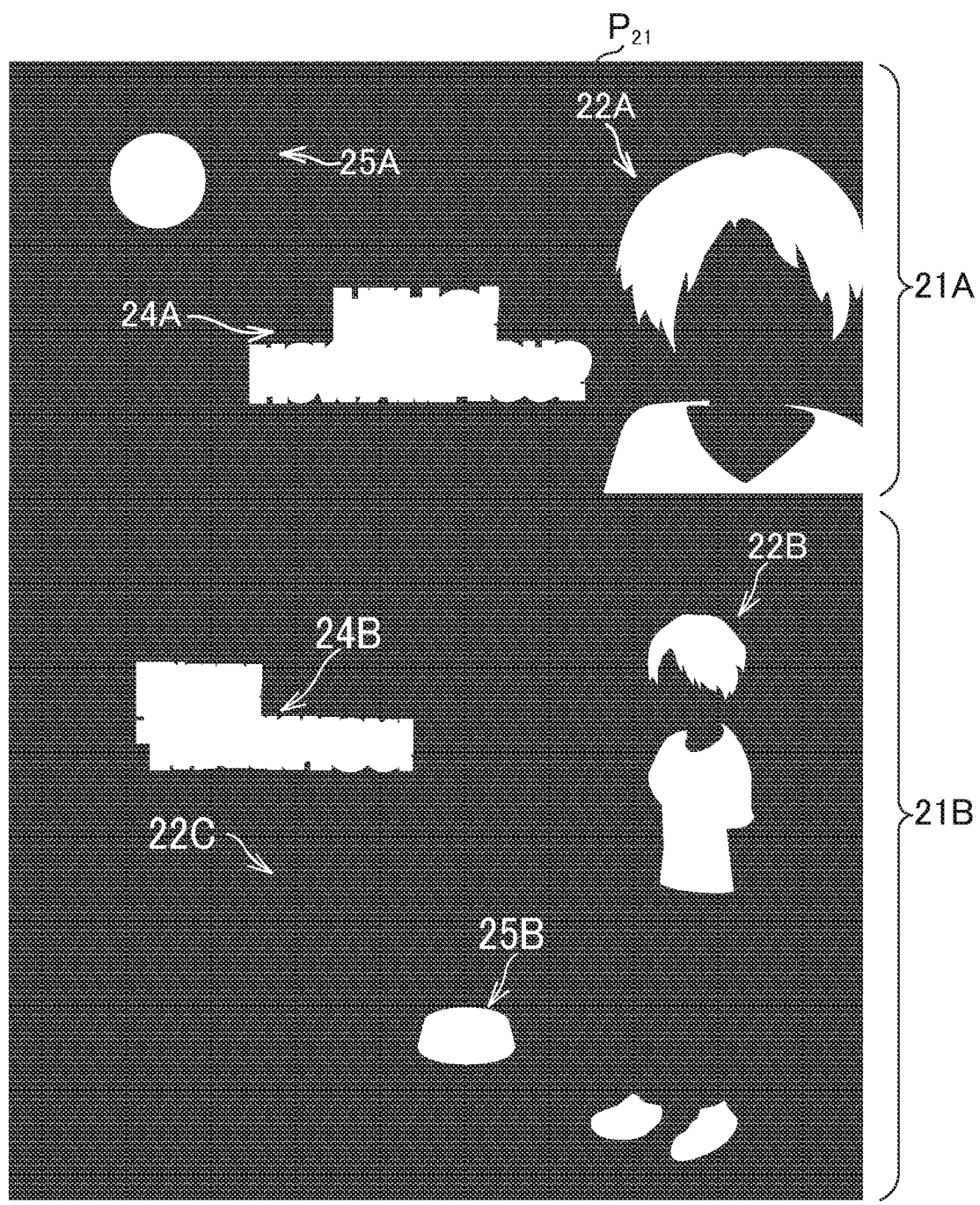
FIG. 13 is a diagram illustrating a page after regions having contours less than a reference size are filled with a background color.

In this embodiment, a case will be discussed in which, if a size of a contour of a region expanded by the expansion unit 104B is less than the reference size, the determination restricting unit 104C fills the region with the background color, thereby restricting the region to be determined by the post-operation character determination unit 106. FIG. 13 is a diagram illustrating the page after the regions having the contours less than the reference size are filled with the background color. For example, since the contours of eyes, noses, and mouths of the characters 22A and 22C and a part of the sun 25A are less than the reference size, the determination restricting unit 104C fills these regions with black as shown in FIG. 13.

A region may be restricted by the post-operation character determination unit 106 from being a target of character determination by a method other than filling the region less than the reference size with the background color. For example, the determination restricting unit 104C may store the position of the region less than the reference size in the data storage unit 100 so as to prevent the post-operation character determination unit 106 from performing the determination processing even if a user specifies the region.

The page related data generating unit 104 stores page related data indicating character region candidates in the data storage unit 100 based on the page $P_{21}$ on which the image processing is performed as described above. In this embodiment, closed regions in white pixels in the page $P_{21}$ (FIG. 13) after the processing by the determination restricting unit 104C is performed are the character region candidates.

Figure 14:
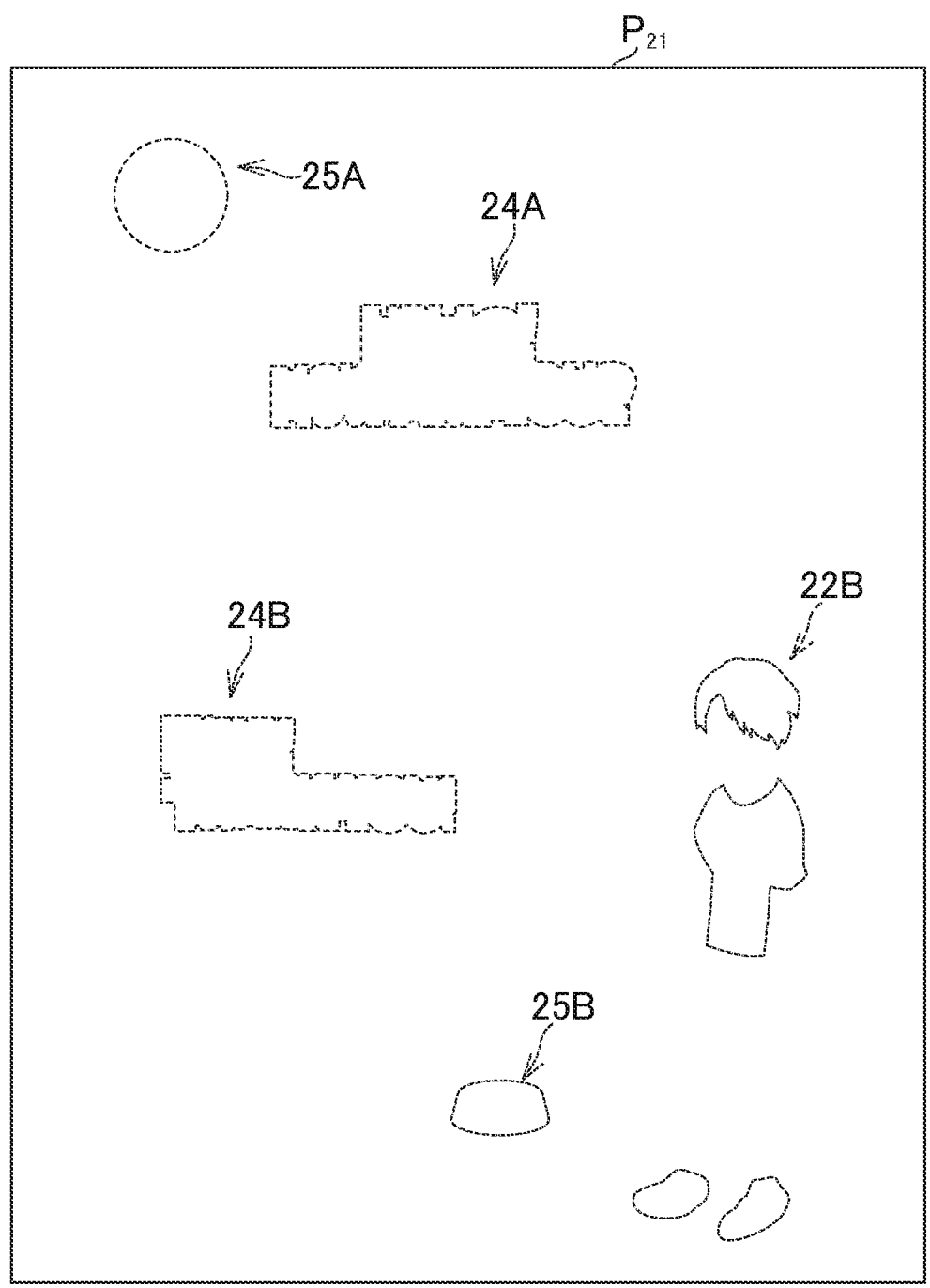
FIG. 14 is a diagram illustrating an example of a character region candidate.

FIG. 14 is a diagram illustrating an example of the character region candidate. The page related data generating unit 104 performs the contour extracting processing on the page P$_{21}$ shown in FIG. 13 so as to extract contours (shown in dashed lines in FIG. 14) of regions of white pixels. The contour extracting processing may be the same as the processing by the union restricting unit 104A. Here, the page related data generating unit 104 extracts the contours of the closed regions, and thus does not extract the contours of the character 22A shown in FIG. 13. The page related data generating unit 104 stores data indicating a position of the extracted contour line in the data storage unit 100 as the page related data.

Here, the data indicating the position of the contour line is taken as an example of data for identifying the character region candidate, although any data that can identify the character region candidate may be used. For example, the page related data generating unit 104 may perform the labeling processing on the page P$_{21}$ shown in FIG. 13 and give the same number to the successive white pixels, thereby storing the data for identifying the character region candidate.

[1-2-6. Specifying Operation Receiving Unit]

When the page P$_{21}$ is displayed on the display unit 14, the specifying operation receiving unit 105 receives specifying operation of the character region candidate. The specifying operation may be operation to specify a region in the page P$_{21}$, for example, operation to specify a position in the page P$_{21}$. In this embodiment, operation performed by the operation unit 13 to specify a position in a display screen of the display unit 14 corresponds to the specifying operation. A region including the position specified by the operation unit 13 is thus specified by the specifying operation. In this embodiment, it can be said that the specifying operation is operation to specify one of the character region candidates.

[1-2-7. Post-Operation Character Determination Unit]

After the specifying operation receiving unit 105 receives the specifying operation, the post-operation character determination unit 106 determines whether a character is included in the character region candidate specified by the specifying operation. In this embodiment, a case will be described in which the post-operation character determination unit 106 performs the determination processing by using the page P$_{21}$ shown in FIG. 4, although the page P$_{21}$ as shown in FIG. 6 or FIG. 9 may be used if the method of character determination is changed according to a condition of an image to be used.

For example, the learning data of character patterns may be stored in the data storage unit 100, and the post-operation character determination unit 106 may compare the character region candidate with the character pattern indicated by the learning data, thereby determining whether the character region candidate includes a character. The learning data defines a plurality of determining items, and, for example, the character determination is performed by the determining items described below.

FIG. 15 is a diagram for explaining character determination processing using the learning data. The post-operation character determination unit 106 determines, as a first determining item, whether a size of the entire character region candidate is equal to or greater than the reference size. The size of the character region candidate may use a size of the bounding rectangle, or may be obtained by counting the number of pixels in the character region candidate. Here, a case will be described in which the bounding rectangle is used. The threshold value T$_3$ indicating the reference size may be the same as or different from the threshold values T$_1$ and T$_2$. Further, similarly to the threshold values T$_1$ and T$_2$, the threshold value T$_3$ may be a fixed value or a variable value. If the size of the bounding rectangle is the reference size or more, the post-operation character determination unit 106 acknowledges a character region.

As shown in FIG. 15, the post-operation character determination unit 106 divides the bounding rectangle into rectangle regions of n squares×m squares (n and m are each an integer of 2 or more, here n=m=10). The post-operation character determination unit 106 determines each of vertical lines (first to tenth columns in FIG. 15) and horizontal lines (first to tenth rows in FIG. 15) of the rectangle regions for the second determining item to the fifth determining item. The determination processing may be performed on all of the squares, or only on some of the squares (e.g., squares other than some of the outer squares).

The post-operation character determination unit 106 determines, as the second determining item, whether the number of white pixels in each line is the reference value or more. The reference value may be a fixed value or a variable value. If the number of white pixels is the reference value or more, the post-operation character determination unit 106 acknowledges a character region. As a third determining item, the post-operation character determination unit 106 scans pixels in the respective lines from the ends, counts the number of times which a white pixel is converted into a black pixel or a black pixel is converted into a white pixel, and determines whether the counted number is a reference value or more. The reference value may also be a fixed value or a variable value. If the counted number is the reference value or more, the post-operation character determination unit 106 acknowledges a character region.

As a fourth determining item, the post-operation character determination unit 106 scans pixels in the respective lines from the ends, and determines whether a position at which the first white pixel is found is located at a predetermined position. For example, if a position at which the first white pixel is found is located within a reference distance from the end, the post-operation character determination unit 106 acknowledges a character region. As a fifth determining item, the post-operation character determination unit 106 scans pixels in the respective lines from the ends, and determines whether a position at which the last white pixel is found is located at a predetermined position. For example, if a position at which the last white pixel is found is located within a reference distance from the end, the post-operation character determination unit 106 acknowledges a character region.

When it is determined that all of the first determining item to the fifth determining item defined in the learning pattern are the character regions, the post-operation character determination unit 106 may determine that the character region candidate is a character region. Alternatively, when it is determined that a predetermined number or more (e.g., three or more) of determining items are the character regions, the character region candidate may be determined as the character region.

The method for determining whether the character region candidate includes a character does not always have to be done by the methods described above, but may be performed in various other ways. For example, the post-operation character determination unit 106 may compare a shape pattern of a character with the character region candidate to calculate the similarity, thereby determining whether the character region candidate includes the character. Alternatively, for example, whether the character region candidate includes a character may be determined using support vector machine (SVM), which is a supervised learning method. In this method, when the learning data is prepared in advance and plural items are entered in a determination algorithm as parameters, the determination algorithm uses the entered parameters and the learning data to obtain an output whether the character region candidate is a character region. By using this method, a character region can be specified more surely even in an image such as comics in which various shapes of characters and pictures are included, for example.

Figure 16:
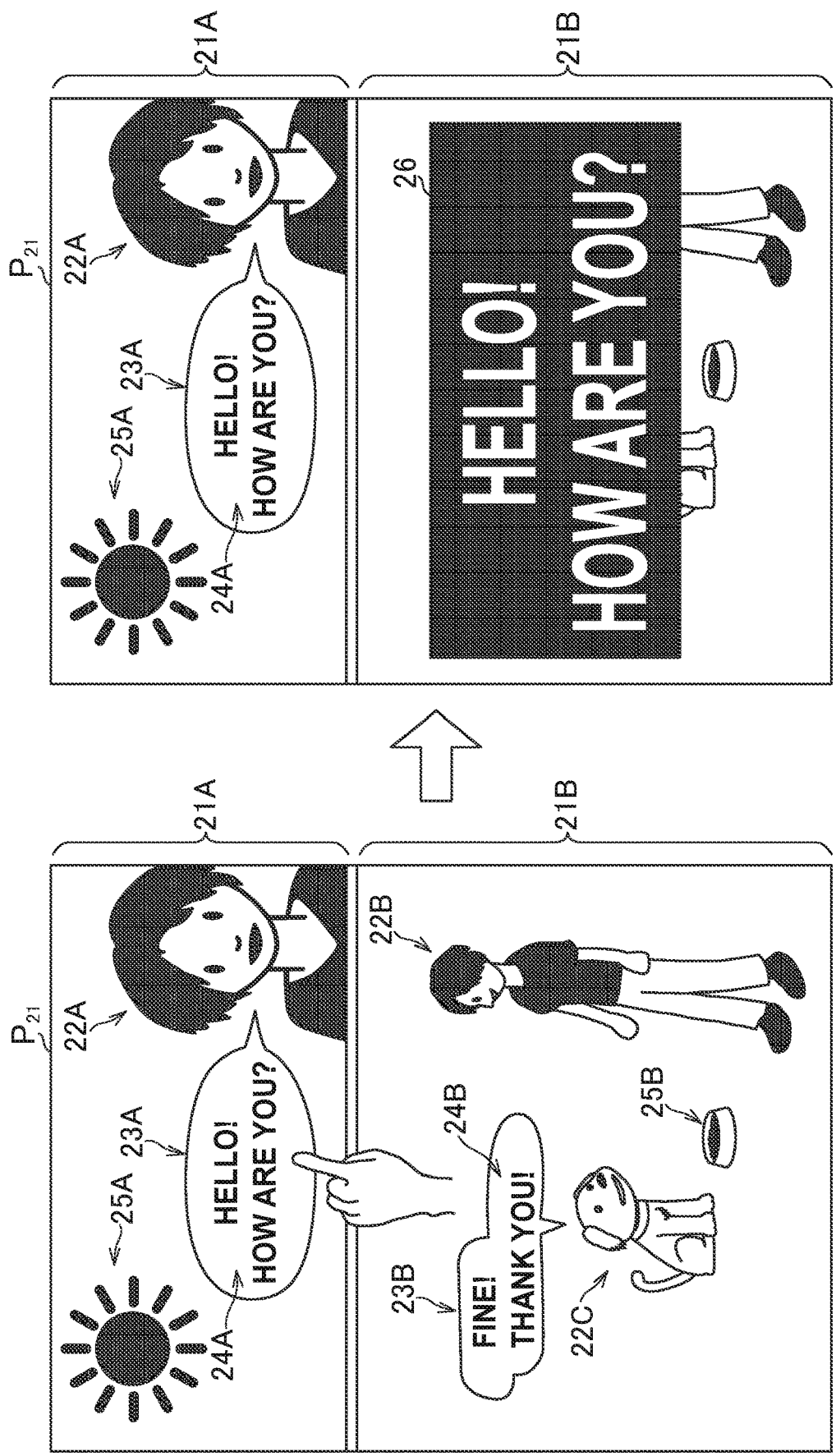
FIG. 16 is a diagram illustrating a character group in an enlarged display.

In this embodiment, the display controlling unit 103 expands the inside of the character region candidate determined by the post-operation character determination unit 106 as including a character, and displays the expanded portion on the display unit 14. FIG. 16 is a diagram illustrating the character group 24A in an enlarged display. As shown in FIG. 16, when a user specifies the character region candidate corresponding to the character group 24A, the post-operation character determination unit 106 performs the character determination processing and acknowledges the characters. The display controlling unit 103 then displays an enlarged image 26 cut out from the character region candidate. In the example of FIG. 16, the display controlling unit 103 cuts out a portion in the character region candidate in the page $P_{21}$ shown in FIG. 9 to expand and display the portion, and thus the characters in the enlarged image 26 are displayed with the colors reversed.

The display controlling unit 103 may cut out a portion in the character region candidate in the page $P_{21}$ shown in FIG. 3 to expand and display the portion. In this case, the colors of the characters in the enlarged image 26 are not reversed. A range cut out as the enlarged image 26 is not limited to a rectangle as shown in FIG. 16, but may be any shape such as an oval. A position to display the enlarged image 26 may be randomly determined, or determined based on a position specified by a user. Further, an enlargement ratio of characters in the enlarged image 26 may be determined based on a size of the character region candidate, or may use a predetermined enlargement ratio.

[1-3. Processing Performed in Electronic Book Display Device]

Figure 17:
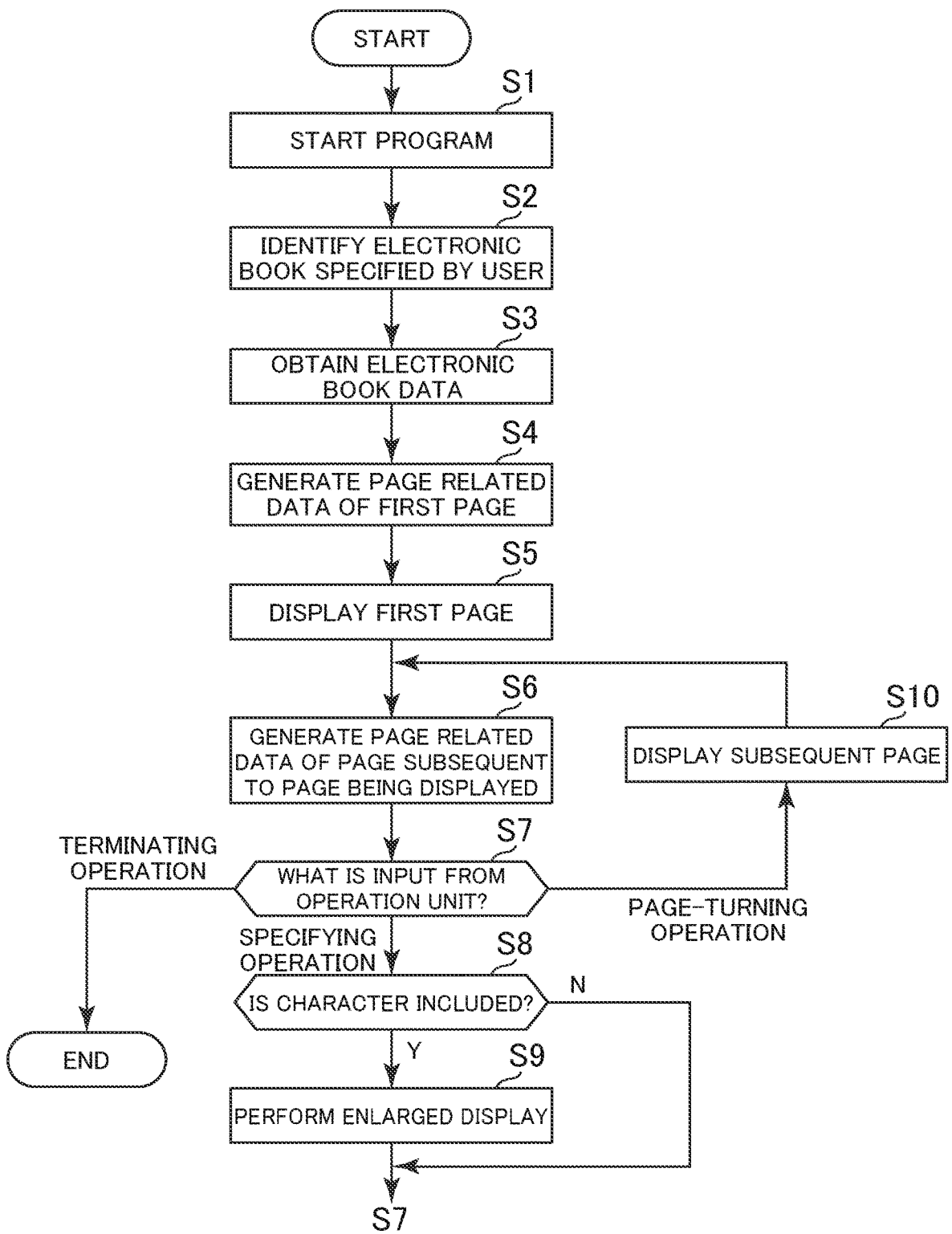
FIG. 17 is a flow chart showing an example of processing performed in the electronic book display device.

FIG. 17 is a flow chart showing an example of the processing performed in the electronic book display device 1. The processing shown in FIG. 17 is performed when the control unit 10 operates according to the program stored in the storage unit 11. In this embodiment, when the processing described below is performed, the functional block shown in FIG. 2 is implemented. For example, when a user uses the operation unit 13 to start the program, the following processing is performed.

As shown in FIG. 17, the control unit 10 starts the program stored in the storage unit 11 (S1), and identifies the electronic book specified by the user based on the input from the operation unit 13 (S2). For example, the program started in S1 is an application of an electronic book reader. In S1, the control unit 10 displays, on the display unit 14, a list of electronic books with image data stored in the storage unit 11. In S2, the control unit 10 identifies the electronic book specified by the user in the list.

The control unit 10 refers to the storage unit 11 and obtains the electronic book data specified by the user (S3). The storage unit 11 stores identification information of the electronic book owned by the user and the electronic book data in association with each other.

Figure 18:
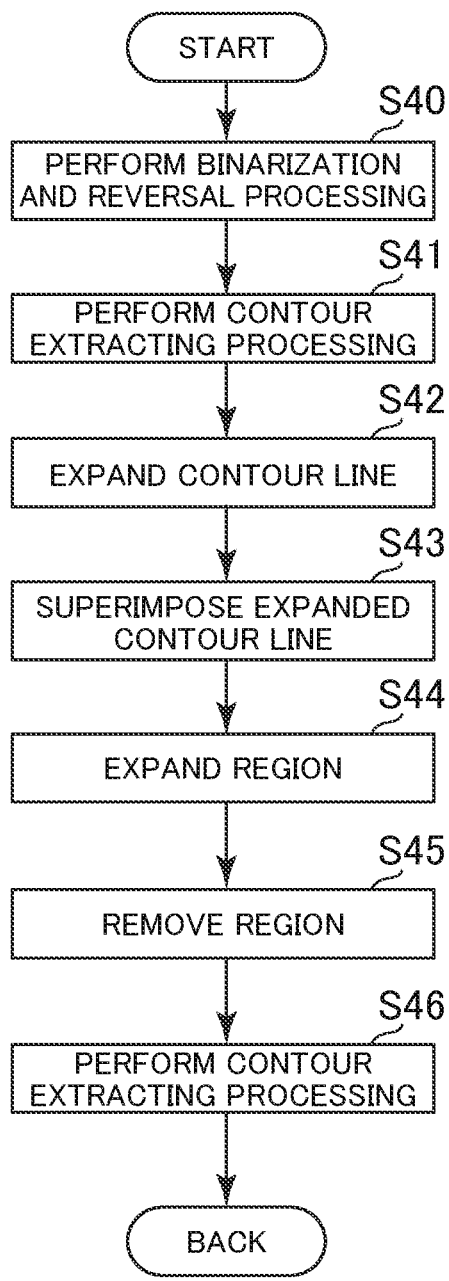
FIG. 18 is a diagram for explaining processing to generate page related data.

The control unit 10 performs the processing to generate page related data of a page $P_1$, which is the first page of the electronic book, based on the electronic book data obtained in S3 (S4). FIG. 18 is a diagram for explaining the processing to generate the page related data. As shown in FIG. 18, the control unit 10 performs the binarization processing and the reversal processing on a page $P_N$ for which page related data is generated (S40). In S40, the control unit 10 generates data of the binarized and reversed page $P_N$ (FIG. 6) and stores the data in the storage unit 11.

The control unit 10 performs contour extracting processing on the page $P_N$ generated in S40 (S41). In S41, the control unit 10 generates data indicating contour lines (FIG. 7) in the page $P_N$ and stores the data in the storage unit 11.

The control unit 10 expands a contour line of the reference size or more (S42) among the contour lines extracted in S41. In S42, the control unit 10 generates data indicating the expanded contour lines (FIG. 7) and stores the data in the storage unit 11. The control unit 10 may also update the data of the contour lines stored in the storage unit 11 in S41 instead of newly generating the data.

The control unit 10 superimposes the contour line expanded in S42 on the page $P_N$ generated in S40 (S43). In S43, the control unit 10 generates data indicating the superimposed page $P_N$ (FIG. 9) and stores the data in the storage unit 11. The control unit 10 may also update the data of the page $P_N$ stored in the storage unit 11 in S41 instead of newly generating the data.

The control unit 10 expands regions in the page $P_N$ on which the contour lines are superimposed in S43 (S44). In S44, the control unit 10 generates data indicating the expanded page $P_N$ (FIG. 12) and stores the data in the storage unit 11. The control unit 10 may also update the data of the page $P_N$ stored in the storage unit 11 in S41 or S43 instead of newly generating the data.

The control unit 10 removes a region of less than the reference size among the regions expanded in the page $P_N$ in S44 (S45). In S45, the control unit 10 stores the data of the page $P_N$ (FIG. 13) in the storage unit 11 after the region less than the reference size is removed. The control unit 10 may also update the data of the page $P_N$ stored in the storage unit 11 in S41, S43, or S44 instead of newly generating the data.

The control unit 10 performs the contour extracting processing on the page $P_N$ after the region is removed in S45 (S46). The processing of S46 is the same as that of S41, and the contour extracted in S46 is the contour of a character region candidate. In S46, the control unit 10 generates data indicating the contour lines (FIG. 14) in the page $P_N$ after the region is removed in S45, and stores the data in the storage unit 11 as the page related data of the page $P_N$.

In S4, the above described processing is performed on the first page $P_1$ of the electronic book, and the page related data of the page $P_1$ is generated. The control unit 10 displays the first page $P_1$ on the display unit 14 (S5), and generates page related data of a page $P_2$ subsequent to the page $P_1$ being displayed on the display unit 14 (S6). In S6, the control unit 10 performs the processing of S40 to S46 shown in FIG. 18 on the page $P_2$, generates page related data of the page $P_2$, and stores the data in the storage unit 11.

The control unit 10 receives input from the operation unit 13 (S7). Here, the user may perform one of the specifying operation of the character region candidate, the page-turning operation, and the terminating operation. If it is determined that the user performs the specifying operation of the character region candidate (S7; specifying operation), the control unit 10 determines whether a character is included in the specified character region candidate (S8). In S8, the control unit 10 determines whether a character is included in the character region candidate based on the learning data and the pixel values in the character region candidate.

If it is determined that a character is included in the character region candidate (S8; Y), the control unit 10 expands and displays a portion in the character region candidate specified by the specifying operation (S9). In S9, the control unit 10 cuts out a portion in the character region candidate in the page $P_N$ being displayed, and displays the portion in an enlarged view on the display unit 14.

If it is determined that the user performs the page-turning operation (S7; page-turning operation), the control unit 10 displays the subsequent page $P_{N+1}$ on the display unit 14 (S10), and returns to S6. In this regard, information about the page $P_N$ being displayed is stored in the storage unit 11. After the processing returns to S6, the page $P_{N+1}$ is displayed on the display unit 14 in S10, and thus the control unit 10 performs the processing to generate page related data of the subsequent page $P_{N+2}$.

If it is determined that the user performs the terminating operation (S7; terminating operation), the processing terminates. The data such as the page related data stored in the storage unit 11 may be discarded when the processing terminates or when the display unit 14 no longer displays the corresponding page. Alternatively, for example, the data may be discarded when a difference from the page being displayed on the display unit 14 becomes the reference value or more.

According to the electronic book display device 1 described above, page related data is not stored in the storage unit 11 beforehand apart from the electronic book data, but the page related data of the subsequent page $P_N$ is generated when the application of the electronic book reader starts and the page $P_N$ is displayed on the unit 14. This eliminates the need for always keeping the page related data, and makes the page related data available while reducing the memory usage of the storage unit 11.

Further, the page related data generating unit 104 generates and stores the character region candidate as the page related data, and thus the character determination is not performed but only extraction of the character region candidate is performed. This reduces the processing load on the electronic book display device 1 while generating the page related data and performing the character determination. Further, the result of the character determination is used for an enlarged display, which makes the region determined as a character more visible.

2. Embodiment 2

Next, another embodiment of the present invention will be described. In the embodiment 1, the case has been described in which, before a page $P_N$ is displayed on the display unit 14, character region candidates are extracted in advance and generated as page related data, and, after the page $P_N$ is displayed on the display unit 14, the character determination is performed on the character region candidates specified by the user. In the embodiment 2, before a page $P_N$ is displayed on the display unit 14, the character determination is completed on each of regions instead of on the character region candidates in the page $P_N$. That is, in the embodiment 2, a case will be described in which extraction of a character region, which is a region determined as a character, is completed before a page $P_N$ is displayed on the display unit 14, and the extracted character region is generated as page related data.

The hardware configuration of the electronic book display device 1 in the embodiment 2 is the same as that in the embodiment 1, and thus their overlapping explanation will be omitted. In the following, explanation of elements that are the same as or equivalent to those of the embodiment 1 will be omitted, and elements that are different from the embodiment 1 will be described.

[2-1. Functions Implemented in Embodiment 2]

Figure 19:
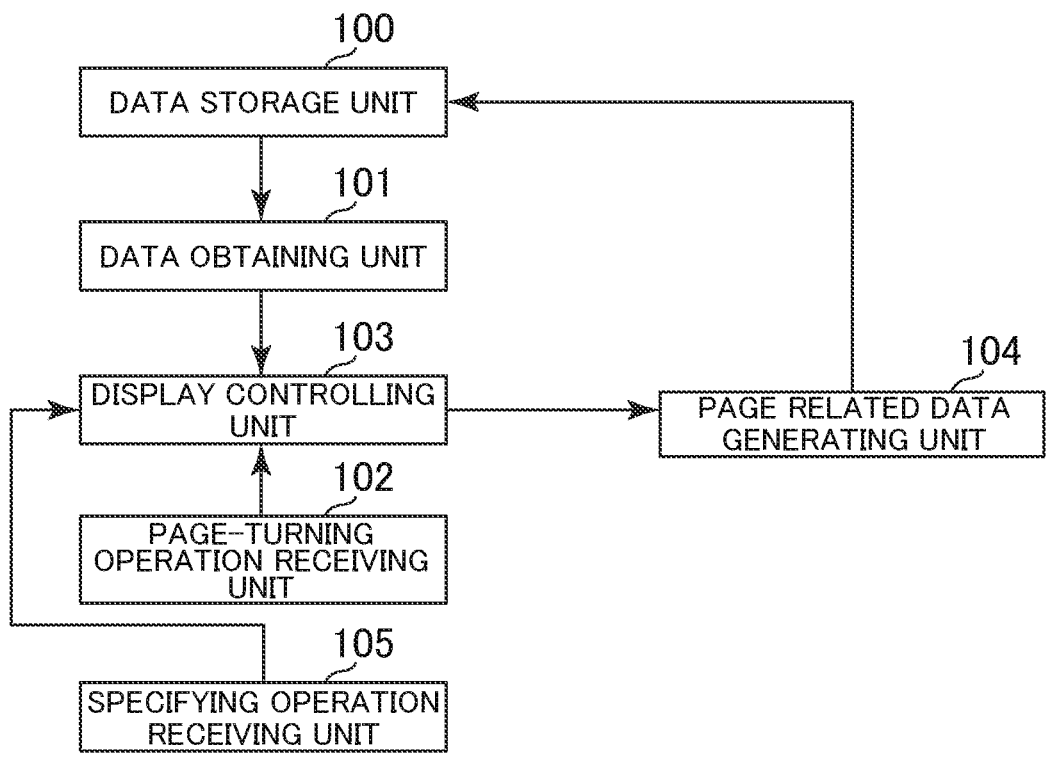
FIG. 19 is a functional block diagram of embodiment 2.

FIG. 19 is a functional block diagram of the embodiment 2. In the embodiment 2, the character determination is completed before a page $P_N$ is displayed, and thus, as shown in FIG. 19, the electronic book display device 1 does not include the post-operation character determination unit 106. Similarly to the explanation of the functional block of the embodiment 1, here, a case will be described as an example in which, when the display controlling unit 103 displays a page $P_{20}$ on the display unit 14, before the next page $P_{21}$ is displayed on the display unit 14, the page related data generating unit 104 generates page related data of the page $P_{21}$.

Before the page $P_{21}$ is displayed on the display unit 14, the page related data generating unit 104 of the embodiment 2 extracts character regions in the page $P_{21}$, and generates and stores page related data. The character region is a part that is determined as a character in an image by the character determination processing. Various known methods may be also used for extracting the character region. The method same as that of the embodiment 1 may be used, although a case will be described here in which the characters in the page $P_N$ are extracted one by one by using optical character recognition (OCR).

The data storage unit 100 of the embodiment 2 stores template data used in the OCR. The template data defines basic shapes of characters that are representable by character code. The page related data generating unit 104 compares each region in the page $P_{21}$ with the template data, thereby extracting a character region from the page $P_{21}$.

For example, the page related data generating unit 104 performs pattern matching between each region in the page $P_{21}$ and the basic shapes defined in the template data. The page related data generating unit 104 calculates similarity between a contour or a shape of each region in the page $P_{21}$ and contours or shapes of the characters defined in the template data. The page related data generating unit 104 determines that a region having the similarity of the reference value or more is a character.

Figure 20:
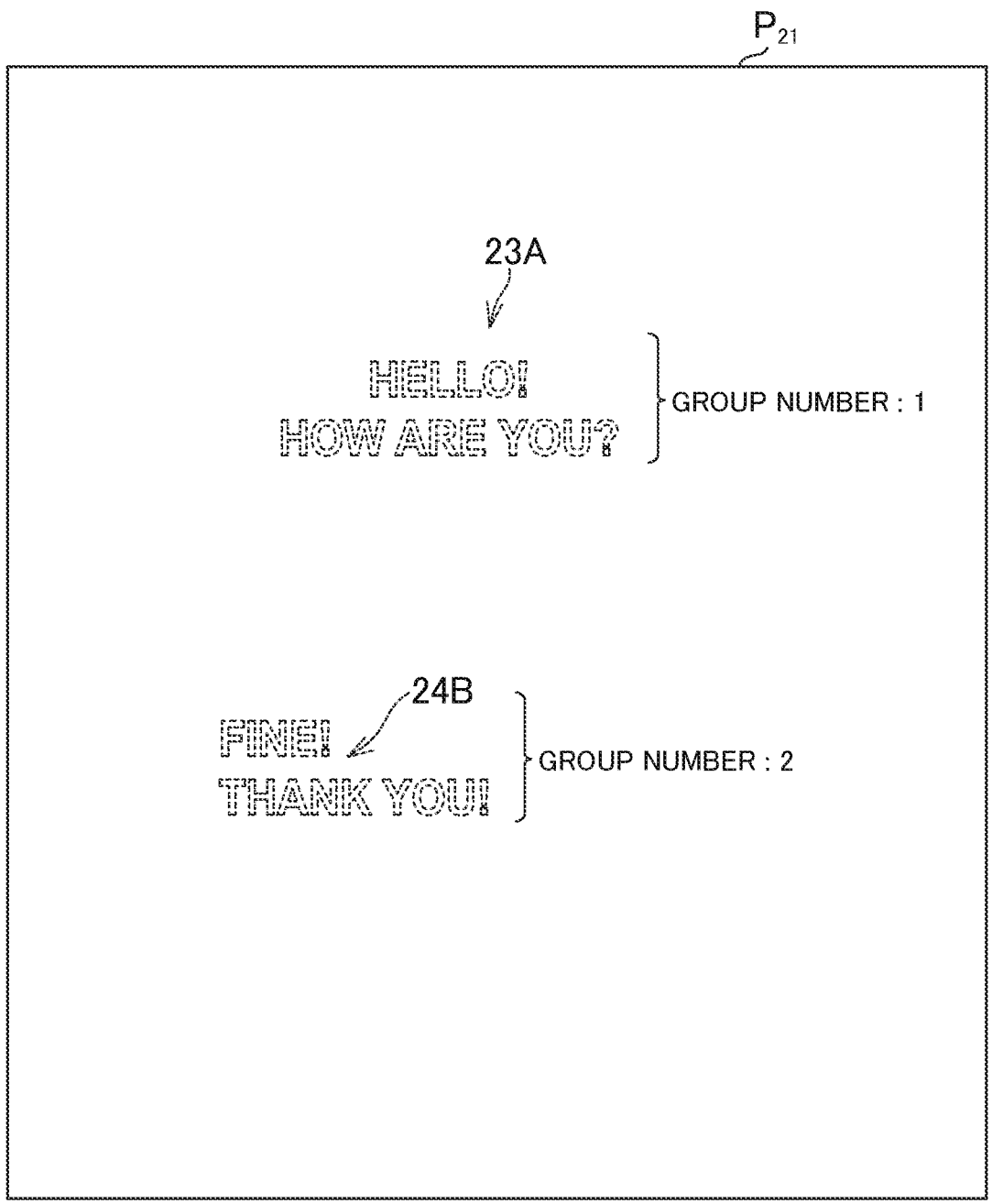
FIG. 20 is a diagram showing results of optical character recognition.

FIG. 20 is a diagram showing results of the OCR. The example shown in FIG. 20 indicates results of the OCR of the page $P_{21}$ shown in FIG. 4. The page related data generating unit 104 determines that "H", "E", "L", "L", "O", "!", "H", "O", "W", "A", "R", "E", "Y", "O", "U", "?" of the character group 24A are characters by the OCR. Similarly, the page related data generating unit 104 determines that "F", "I", "N", "E", "!", "T", "H", "A", "N", "K", "Y", "O", "U", "!" of the character group 24B are characters. The page related data generating unit 104 may separately extract these characters as separate character regions (i.e., extract one character as one character region), although in the embodiment 2, a case will be described in which characters close to one another are grouped and extracted as one character region.

The page related data generating unit 104 calculates distances between the regions specified as characters (distances in the screen coordinate system), and characters within a reference distance $L_1$ are placed in the same group. For example, the page related data generating unit 104 calculates a distance between "H" and "E", which are portions of "HELLO!" in the character group 24A, and determines whether the distance is within the reference distance $L_1$. Here, the distance is within the reference distance $L_1$, and thus "H" and "E" are determined as the same group and provided with a group number "1." After the same processing is performed on each character, the group number "1" is provided to each of "H", "E", "L", "L", "O", "!", "H", "O", "W", "A", "R", "E", "Y", "O", "U", and "?", and the group number "2" is provided to each of "F", "I", "N", "E", "!", "T", "H", "A", "N", "K", "Y", "O", "U", and "!". In this manner, the page related data generating unit 104 extracts "HELLO! HOW ARE YOU?" in the character group 24A as one character region, and "FINE! THANK YOU!" in the character group 24B as one character region.

The page related data generating unit 104 stores page related data indicating the character regions extracted as described above in the data storage unit 100. Here, a group number and a position (coordinates of pixels in the screen coordinate system) of a region belonging to the group number are associated with each other in the page related data.

The specifying operation receiving unit 105 of the embodiment 1 receives the specifying operation of the character region candidate, while the specifying operation receiving unit 105 of the embodiment 2 receives the specifying operation of the character region when the page $P_{21}$ is displayed on the display unit 14. For example, a character region including a position specified by the operation unit 13 is specified by the specifying operation.

When the specifying operation receiving unit 105 receives the specifying operation, the display controlling unit 103 of the embodiment 2 expands the inside of the character region specified by the specifying operation, and displays the expanded portion on the display unit 14. For example, the display controlling unit 103 cuts out each character provided with the group number of the character region specified by the specifying operation, and displays the cut-out characters as an enlarged image 26. The enlarged image 26 is displayed in the same manner as shown in FIG. 16 described in the embodiment 1. Also similarly to the embodiment 1, the colors of the characters in the enlarged image 26 may be reversed, or not be reversed and displayed in the same color.

[2-2. Processing Performed in Embodiment 2]

Figure 21:
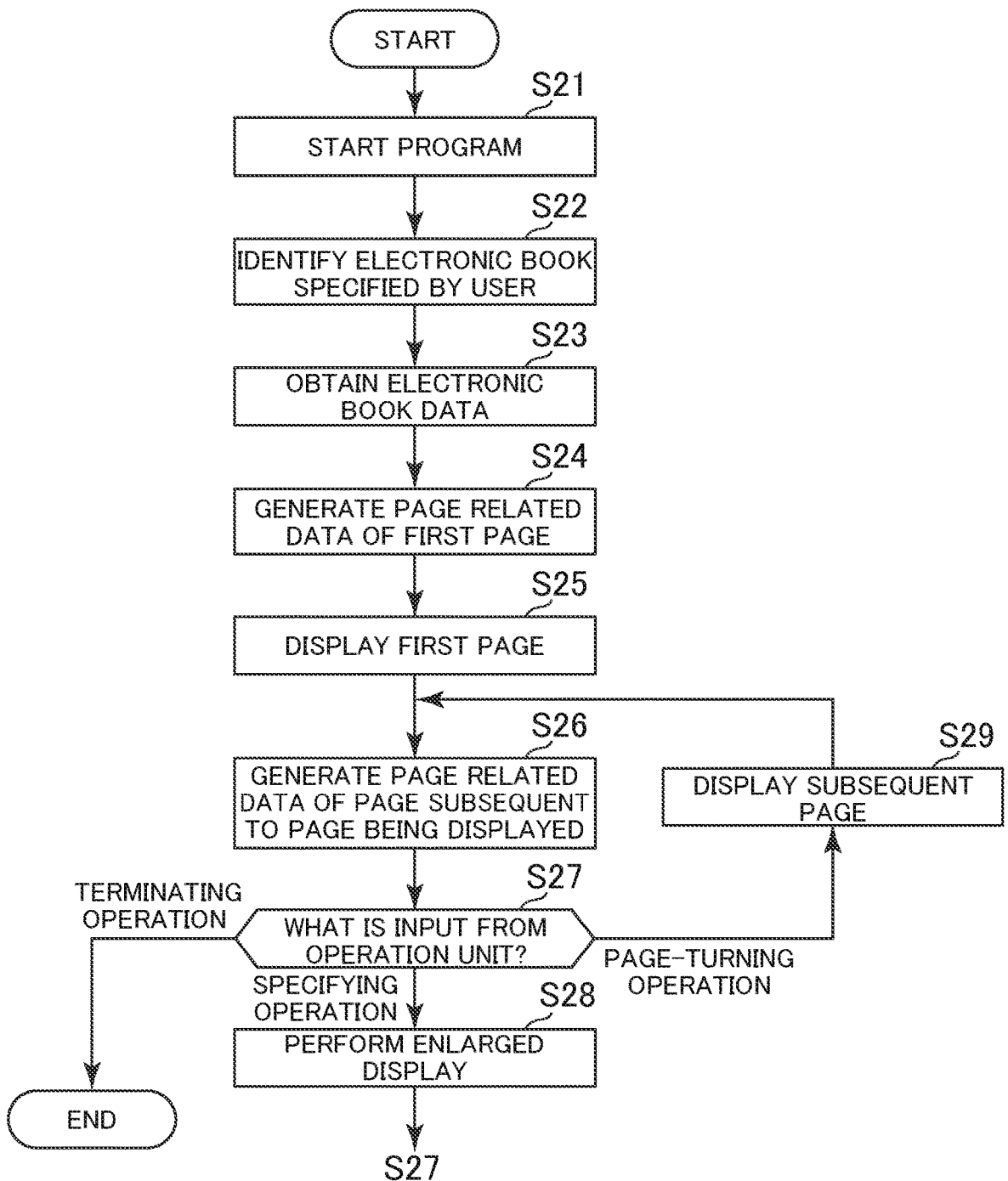
FIG. 21 is a flow chart of the embodiment 2.

FIG. 21 is a flow chart of the embodiment 2. As shown in FIG. 21, S21 to S23 are the same as S1 to S3. S24 and S4 are similar in that the page related data of the first page $P_1$ is generated, although the processing of S24 is different from that of S4 because the page related data indicates the character region candidate in the embodiment 1, and indicates the character region in the embodiment 2.

Figure 22:
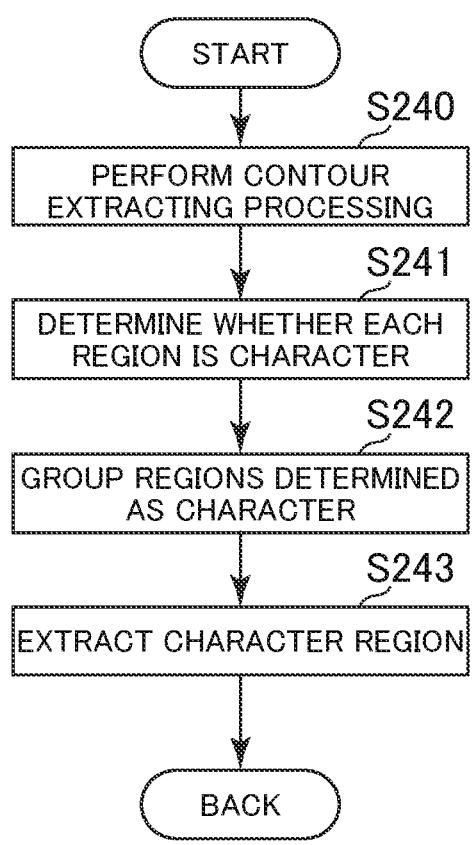
FIG. 22 is a diagram showing processing for generating page related data in the embodiment 2.

FIG. 22 is a diagram showing the processing for generating the page related data in the embodiment 2. As shown in FIG. 22, the control unit 10 performs contour extracting processing on a page $P_N$ (S240). The contour extracting processing is the same as in S41. The control unit 10 generates data indicating contour lines in the page $P_N$, and stores the data in the storage unit 11. The contour extracting processing in S240 is for extracting a region in the page $P_N$, and may extract a region by a method other than the contour extraction.

The control unit 10 determines whether each region is a character based on the regions from which the contours are extracted in S240 and the template stored in the storage unit 11 (S241). In S241, the control unit 10 calculates similarities and determines whether the similarities are the reference value or more. The control unit 10 stores data of a region having the similarity equal to or more than the reference value in the storage unit 11.

The control unit 10 calculates distances between the regions determined as characters in S241, and groups the regions (S242). In S242, the control unit 10 calculates distances between the regions stored in S241 in the screen coordinate system, and provides the same group number to the regions within the reference distance $L_1$.

The control unit 10 extracts a character region based on the regions grouped in S242 (S243). In S243, the control unit 10 generates data indicating the group numbers and the regions provided with the group numbers, and stores the data in the storage unit 11 as page related data.

Returning to FIG. 17, S25 to S27 are respectively the same as S5, S24, and S7. In S26, the processing in S240 to S243 is performed on the page $P_2$, and character regions in the page $P_2$ are extracted. The specifying operation in the embodiment 2 is not an operation to specify a character region candidate as in the embodiment 1, but an operation to specify a character region. In the embodiment 2, since the character determination is already completed, the processing in S8 is not performed unlike the embodiment 1.

When it is determined that the user performs the specifying operation of the character region (S27; specifying operation), the control unit 10 expands and displays the character region specified by the specifying operation (S28). In S28, the control unit 10 cuts out the character region from the page $P_N$ being displayed, and displays the character region in an enlarged view on the display unit 14. S29 is the same as S10, and the control unit 10 displays the next page $P_{N+1}$ on the display unit 14 in response to the page-turning operation, and returns to S26. In this case, in S26, the page $P_{N+1}$ is displayed on the display unit 14, and thus the processing in S240 to S243 is performed on the next page $P_{N+2}$ to extract the character regions in the page $P_{N+2}$.

According to the embodiment 2 described above, the page related data is not stored in the storage unit 11 beforehand apart from the electronic book data, but the page related data of the subsequent page $P_N$ is generated when the application of the electronic book reader starts and the page $P_N$ is displayed on the unit 14. This eliminates the need for always keeping the page related data, and makes the page related data available while reducing the memory usage of the storage unit 11. Further, unlike the embodiment 1 in which the specifying operation is performed before the character determination, extraction of the character regions is completed beforehand in the embodiment 2, and thus it is possible to shorten the time until the character regions are expanded and displayed after the specifying operation is performed.

3. Variation

The present invention is not to be limited to the above described embodiment, and can be changed as appropriate without departing from the spirit of the invention.

Figure 23:
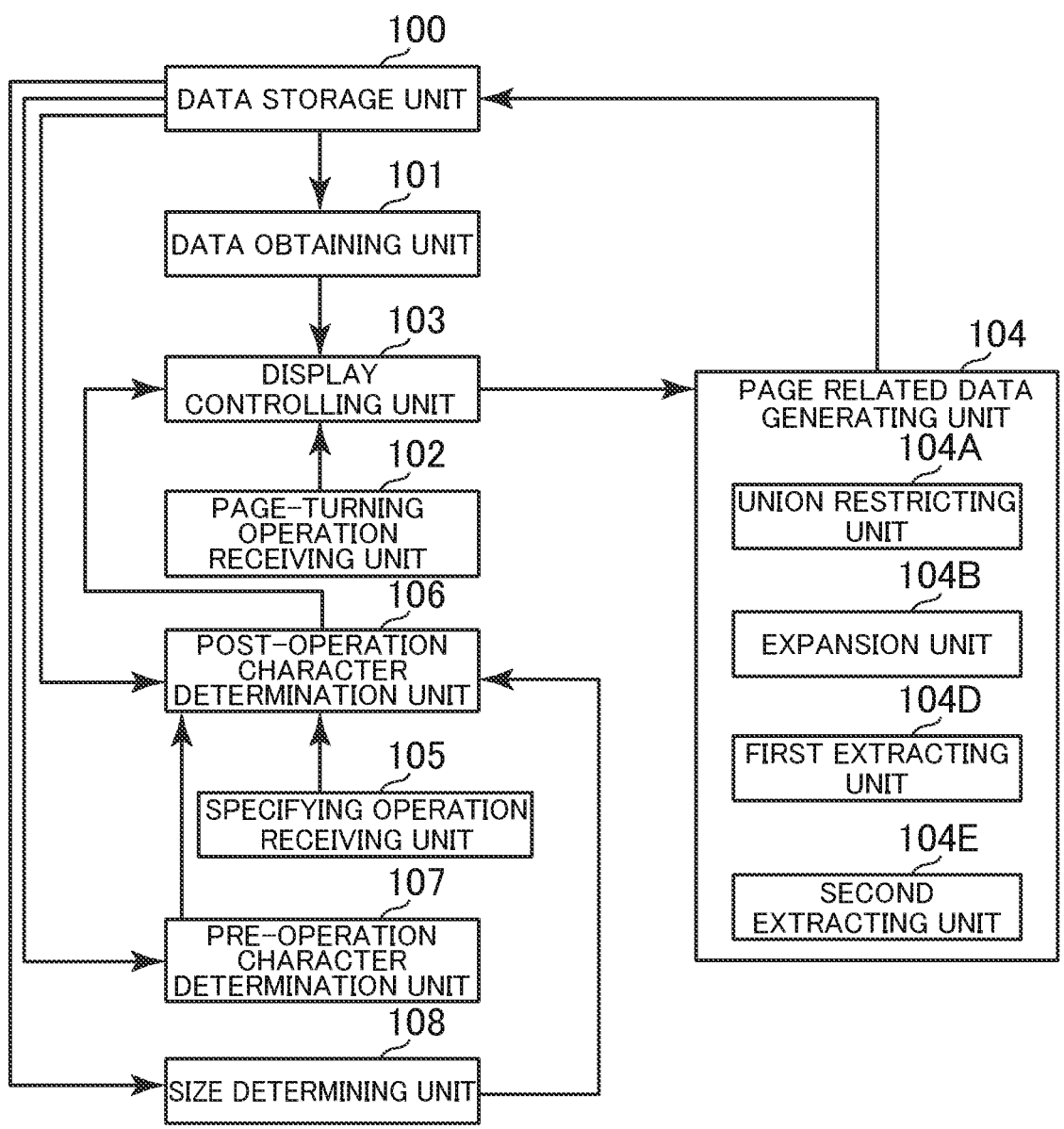
FIG. 23 is a functional block diagram of variation (1)

(1) First, a variation regarding the embodiment 1 will be described. FIG. 23 is a functional block diagram of variation (1). As shown in FIG. 23, a pre-operation character determination unit 107 and a size determining unit 108 are implemented in addition to the functions of the embodiment 1. These functions are implemented mainly by the control unit 10. Here, similarly to the embodiment 1, a case will be described as an example in which the page related data generating unit 104 generates page related data of the page $P_{21}$.

(1-1) For example, before specifying operation is performed on the page $P_{21}$, simplified character determination processing may be performed on character region candidates in the page $P_{21}$. If the simplified character determination processing determines that a character region candidate does not include a character, detailed character determination processing may not be performed on such a character region candidate, and if the simplified character determination processing determines a character region candidate includes a character, the detailed character determination processing may be performed on such a character region candidate.

In the variation (1-1), the pre-operation character determination unit 107 is implemented. The pre-operation character determination unit 107 performs first character determination processing on a character region candidate before the specifying operation receiving unit 105 receives specifying operation. Various types of character determination processing may be applicable to the first character determination processing, although the first character determination processing has lower accuracy than second character determination processing described later. The lower accuracy means accuracy to detect a character.

The first character determination processing is more simplified processing than the second character determination processing, and requires shorter time to be completed as compared with the second character determination processing. The number of determining items in the first character determination processing is less than the number of determining items in the second character determination processing. For example, the first character determination processing may determine only a shape of a contour, and the second character determination processing may determine a shape and other elements (e.g., positional relationship with surrounding regions or patterns of white pixels and black pixels).

Here, the second character determination processing performs all of the first determining item to the fifth determining item described in the embodiment 1, and the first character determination processing performs only the first determining item. The first character determination processing may perform the determination processing only on one of the second determining item to the fifth determining item, or on two or more and less than four of the first determining item to the fifth determining item, instead of performing only the first determining item.

In the example shown in FIG. 14, the character 22B, the sun 25A, and the dish 25B are extracted as the character region candidates in addition to the character groups 24A and 24B. The pre-operation character determination unit 107 performs the first character determination processing in advance, thereby determining that a character is not included in the sun 25A and the dish 25B, which are relatively small regions. As such, before the page $P_{21}$ is displayed on the display unit 14, the character region candidates on which the second character determination processing is performed are limited to the character groups 24A and 24B and the character 22B.

If a character region candidate that is determined by the pre-operation character determination unit 107 as including a character is specified by the specifying operation, the post-operation character determination unit 106 performs the second character determination processing, which has higher accuracy than the first character determination processing. The second character determination processing may be the same as the processing described in the embodiment 1. Even if a character region candidate that is determined by the pre-operation character determination unit 107 as not including a character is specified by the specifying operation, the post-operation character determination unit 106 does not perform the second character determination processing on such a character region candidate.

The character region candidate determined by the pre-operation character determination unit 107 as not including a character may not be determined by the post-operation character determination unit 106. For example, the specifying operation receiving unit 105 may be restricted not to receive the specifying operation of such a character region candidate. Alternatively, the specifying operation of such a character region candidate may be received, but the post-operation character determination unit 106 simply may not perform the second character determination processing.

According to the variation (1-1), the relatively simple first character determination processing is performed in advance, and thus the character region candidates can be narrowed down in advance. For example, memory capacity can be effectively used by discarding the page related data indicating the character region candidate determined by the first character determination processing as not including a character. Further, by narrowing down the character region candidates, the detailed second character determination processing needs not to be performed on the character region candidate determined by the first character determination processing as not being a character, and thus the processing load on the electronic book display device 1 can be reduced.

(1-2) For example, if the number of character region candidates in the page $P_{21}$ is small, the number of pictures is large and the number of characters is small. As such, even if the page $P_{21}$ is displayed on the display unit 14, the probability that the user quickly reads the page $P_{21}$ and performs page-turning operation to proceed to the next page $P_{22}$ is high. If the display time of the page $P_{21}$ is short, character region candidates in the page $P_{22}$ may not possibly be extracted by the time the page $P_{22}$ is displayed. As such, in a case where the number of character region candidates in the page $P_{21}$ is small, even if the page $P_{21}$ is not yet displayed, character region candidates in the next page $P_{22}$ may be extracted.

If the number of the character region candidates in the page $P_{21}$ is less than the reference value, the page related data generating unit 104 may further extract character region candidates in the page $P_{22}$ subsequent to the page $P_{21}$ to generate and store page related data. A threshold value $T_4$ indicating such a reference value may be a fixed value or a variable value.

The page related data generating unit 104 counts the number of the character region candidates extracted from the page $P_{21}$, and determine whether the number is the threshold value $T_4$ or more. When it is determined that the number of the character region candidates in the page $P_{21}$ is the threshold value $T_4$ or more, the page related data generating unit 104 does not extract character region candidates in the page $P_{22}$ while the page $P_{20}$ is displayed on the display unit 14. In this case, the character region candidates in the page $P_{22}$ are extracted when the page $P_{21}$ is displayed on the display unit 14.

When it is determined that the number of the character region candidates in the page $P_{21}$ is less than the threshold value $T_4$, the page related data generating unit 104 extracts character region candidates in the page $P_{22}$ even while the page $P_{20}$ is being displayed on the display unit 14 (before the page $P_{21}$ is displayed on the display unit 14). The method for extracting character region candidates is the same as that described in the embodiment 1.

According to the variation (1-2), if the number of the character region candidates in the page $P_{21}$ is small, page related data of the next page $P_{22}$ is also generated. As such, even if the user reads the page $P_{21}$ in a short time and displays the page $P_{22}$, the page related data can be generated by the time the page $P_{22}$ is displayed on the display unit 14. With this configuration, it is possible to avoid such a condition that, when the user specifies the page $P_{22}$, enlarged display cannot be timely performed because the page related data is not generated yet.

(1-3) For example, in the embodiment 1, the determination restricting unit 104C removes a small region in advance to eliminate such a region from the character determination performed by the post-operation character determination unit 106, although the determination restricting unit 104C may be omitted and the page related data generating unit 104 may extract even a small region as a character region candidate. In this case, the page related data generating unit 104 may determine a size of the character region candidate, and, if the size of the character region candidate is small, such a character region candidate may be eliminated from the character determination by the post-operation character determination unit 106.

In the variation (1-3), the size determining unit 108 is implemented. The size determining unit 108 determines whether a size of a contour of a character region candidate or a size of the character region candidate is a reference value or more. The reference value may be the same as the threshold value $T_2$ used by the determination restricting unit 104C in the embodiment 1. The determination method of the size determining unit 108 is the same as that of the determination restricting unit 104C in the embodiment 1.

The post-operation character determination unit 106 does not determine a character region candidate that is determined by the size determining unit 108 as having a size less than the reference value, and determines whether a character is included in a character region candidate that is determined by the size determining unit 108 as having a size of the reference value or more. That is, the post-operation character determination unit 106 restricts a character region candidate that is determined as having a size less than the reference value from being a target of the character determination. The restricting method may be the same as the method of the determination restricting unit 104C described in the embodiment 1. That is, if a size of a contour of a character region candidate is less than the reference value, the post-operation character determination unit 106 may fill the character region candidate with the background color.

According to the variation (1-3), the character region candidate having a size less than the reference value is not a target of the character determination. This prevents the character determination from being performed on a region that is less likely a character region, and reduces the processing load on the electronic book display device 1. For example, the memory capacity can be effectively used by discarding the page related data indicating the character region candidate of a size less than the reference value.

(1-4) For example, the user reads the page $P_{21}$ sequentially from top to bottom, and thus, before the page $P_{21}$ is displayed on the display unit 14, the character region candidates may be extracted only from the upper part of the page $P_{21}$ (i.e., the part the user reads first) instead of being extracted from the entire page $P_{21}$.

The page related data generating unit 104 in this variation includes at least one of a first extracting unit 104D and a second extracting unit 104E. The first extracting unit 104D extracts character region candidates not from the lower region of the page $P_{21}$ but from the upper region of the page $P_{21}$.

Figure 24:
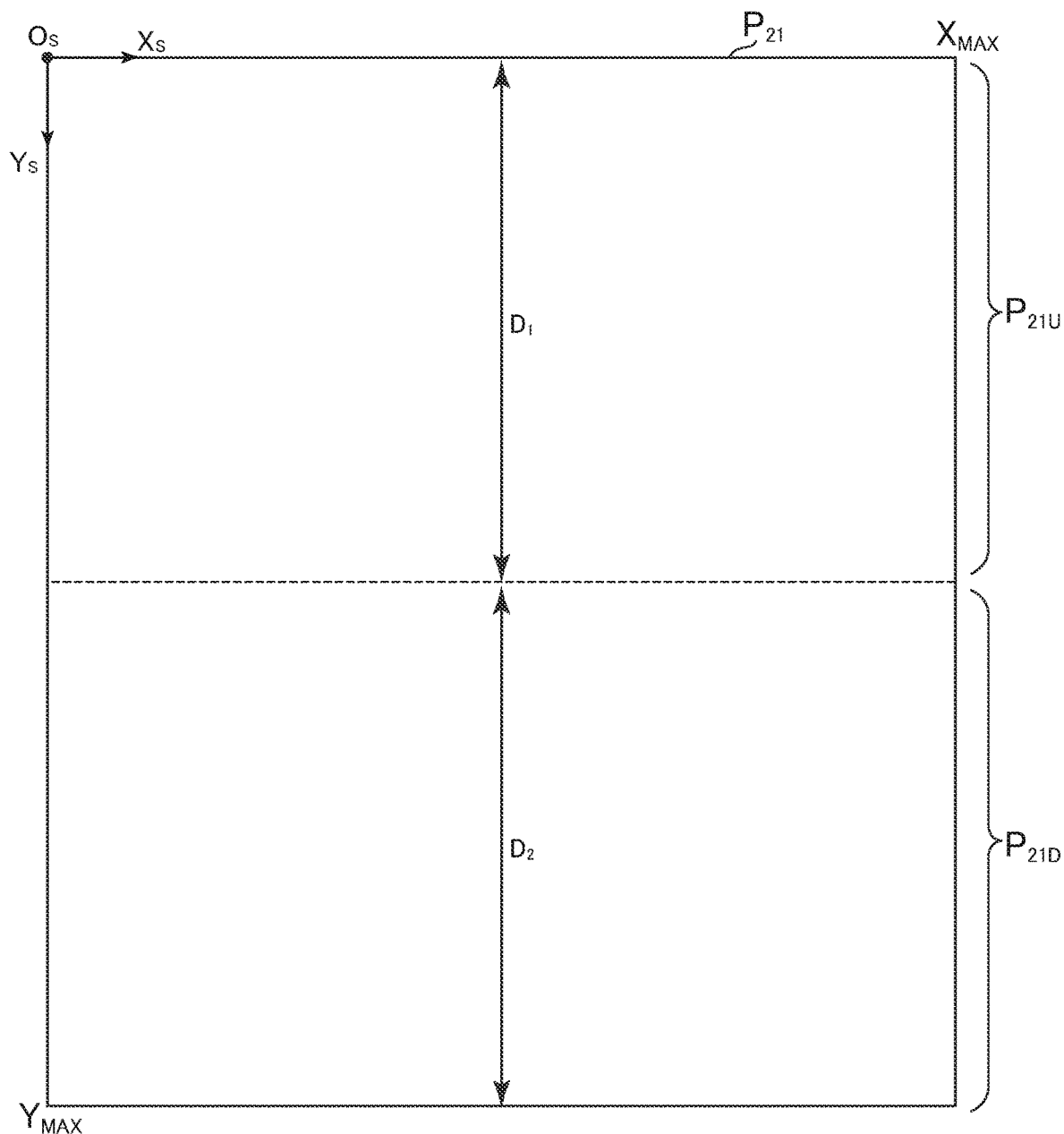
FIG. 24 is a diagram for explaining an upper region and a lower region of a page.

FIG. 24 is a diagram for explaining the upper region and the lower region of the page $P_{21}$. In the example shown in FIG. 24, the character 22A and other regions in the page P21 are omitted. For example, when the left corner of the page $P_{21}$ is the origin $O_S$ of the screen coordinate system, an upper region $P_{21U}$ is a part within a predetermined distance $D_1$ from the upper edge ($Y_S$=0) of the page $P_{21}$. A lower region $P_{21U}$ is a part within a predetermined distance $D_2$ from the lower edge ($Y_S$=$Y_{MAX}$) of the page $P_{21}$, and here, a part other than the upper region $P_{21U}$. The first extracting unit 104D extracts character region candidates not from the entire page $P_{21}$ but from the upper region $P_{21U}$. The method for extracting the character region candidates may be the same as that of the embodiment 1.

The second extracting unit 104E extracts character region candidates in the page $P_{21}$ in the reading order of character regions until the number of the character region candidates reaches the reference value. The reading order of character regions is an order of reading character regions when the character regions are scattered in the page $P_{21}$. For example, if the characters are written horizontally, the character region closer to the upper left has an earlier order. If the characters are written vertically, the character region closer to the upper right has an earlier order.

Figure 25:
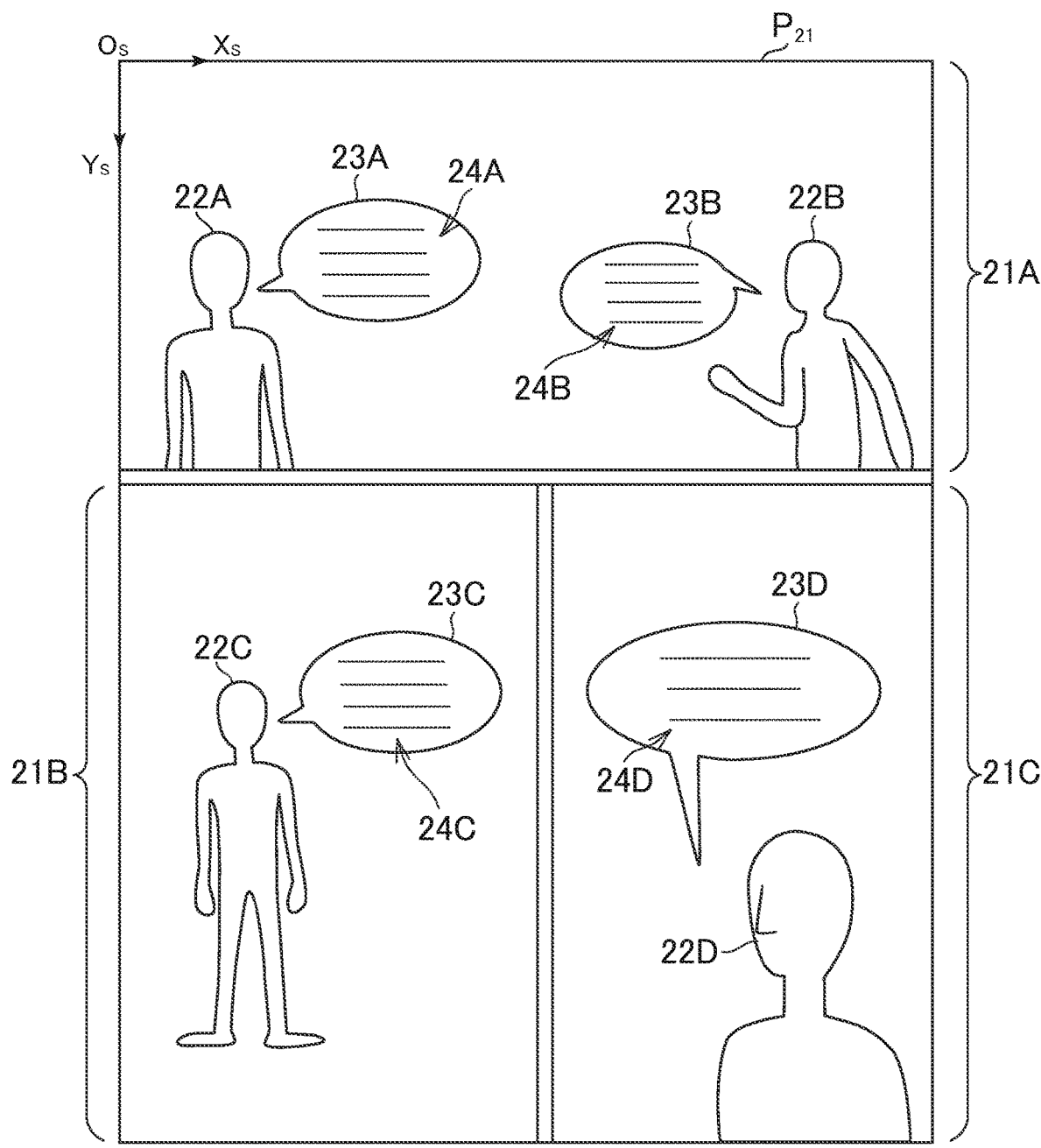
FIG. 25 is a diagram for explaining a reading order in a page.

FIG. 25 is a diagram for explaining the reading order in the page $P_{21}$. In the example of FIG. 25, the page $P_{21}$ includes three frames 21A to 21C. The frame 21A includes characters 22A and 22B, balloons 23A and 23B, and character groups 24A and 24B. The frame 21B includes a character 22C, a balloon 23C, and a character group 24C. The frame 21C includes a character 22D, a balloon 23D, and a character group 24D. Here, there are four character groups 24A to 24D. The characters are written horizontally, and thus the reading order of these character groups is an order closer to the origin $O_S$ at the left corner of the page $P_{21}$, namely, in the order of the character groups 24A, 24B, 24C, and 24D. If the reference value is two, the second extracting unit 104E extracts the character region candidates corresponding to the character groups 24A and 24B in the page $P_{21}$ in the reading order of the character regions. The second extracting unit 104E does not extract the subsequent character region candidate until a predetermined time arrives.

According to the variation (1-4), page related data is preferentially generated regarding the upper region $P_{21U}$, which is likely read by the user first when the page $P_{21}$ is displayed on the display unit 14, and regions having the early reading order. With this configuration, it is possible to avoid such a condition that, when the user specifies the page $P_{22}$, enlarged display cannot be timely performed because the page related data is not generated yet.

Figure 26:
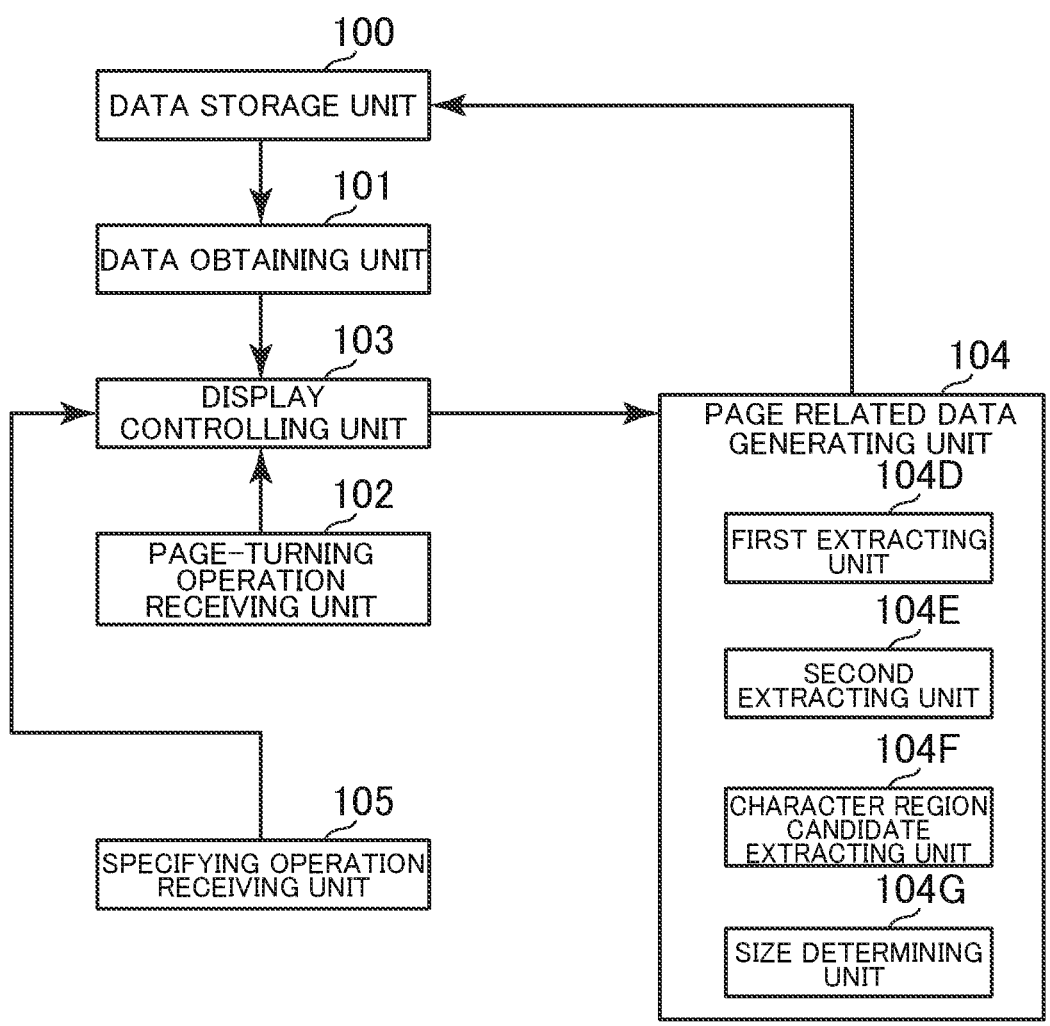
FIG. 26 is a functional block diagram of variation (2)

(2) Next, a variation of the embodiment 2 will be described. FIG. 26 is a functional block diagram of the variation (2). As shown in FIG. 26, a character region candidate extracting unit 104F and a size determining unit 104G are implemented in addition to the functions in the embodiment 2. In the variation 2, a case will be described as an example in which, similarly to the embodiment 2, the page related data generating unit 104 generates page related data of the page $P_{21}$.

(2-1) For example, in the embodiment 2, the case has been discussed in which the page related data generating unit 104 extracts a character region by using the OCR, although the character region may be extracted in the same manner as the embodiment 1. In the variation (2-1), the character region candidate extracting unit 104F is implemented. The character region candidate extracting unit 104F extracts character region candidates in the page $P_{21}$ before the page $P_{21}$ is displayed on the display unit 14.

The character region candidate extracting unit 104F has the same function as the page related data generating unit 104 described in the embodiment 1. The character region candidate extracting unit 104F extracts character region candidates as shown in FIG. 14 from the page $P_{21}$ as shown in FIG. 4.

The page related data generating unit 104 determines whether the character region candidate includes a character, thereby extracting a character region. The determination method may be the same as that of the post-operation character determination unit 106 described in the embodiment 1.

According to the variation (2-1), the character determination may be performed on the character region candidate, and thus the character determination can be performed effectively compared to the case in which the character determination is performed on the entire image.

(2-2) Further, for example, similarly to the variation (1-1), the two steps of the character determination including the simplified character determination processing and the detailed character determination processing may be performed in the embodiment 2. The page related data generating unit 104 performs the first character determination processing on the character region candidates before the page $P_{21}$ is displayed on the display unit 14. The first character determination processing is the same as that of the variation (1-1).

The page related data generating unit 104 performs the second character determination processing, which has higher accuracy than the first character determination processing, on the character region candidate that is determined by the first character determination processing as including a character, thereby extracting the character region. The second character determination processing is the same as that of the variation (1-1).

According to the variation (2-2), the relatively simpler first character determination processing is performed in advance, and thus the character region candidates can be narrowed down. For example, the memory capacity can be effectively used by discarding the page related data indicating the character region candidate that is determined by the first character determination processing as not including a character. Further, by narrowing down the character region candidates, the detailed second character determination processing is not performed on the character region candidate that is determined by the first character determination processing as not including a character, and thus the processing load on the electronic book display device 1 can be reduced.

(2-3) Further, in the embodiment 2 as well, similarly to the variation (1-3), if a character region candidate is small, such a character region may be excluded from targets of the character determination by the post-operation character determination unit 106. In the variation (2-3), a size determining unit 104G is implemented. The size determining unit 104G has the same function as that of the size determining unit 108 in the variation (1-3).

The page related data generating unit 104 extracts a character region by not determining a character region candidate that is determined by the size determining unit 104G as having a size less than the reference value, but determining whether a character is included in a character region candidate that is determined by the size determining unit 104G as having a size of the reference value or more. The processing may be the same as that of the post-operation character determination unit 106 in the variation (1-3) or that of the determination restricting unit 104C in the embodiment 1.

According to the variation (2-3), the character region candidate having a size less than the reference value is not a target of the character determination. This prevents the character determination from being performed on a region that is less likely a character region, and reduces the processing load on the electronic book display device 1. For example, the memory capacity can be effectively used by discarding the page related data indicating the character region candidate of a size less than the reference value.

(2-4) For example, in the embodiment 2, similarly to the variation (1-2), if the number of character region candidates in the page $P_{21}$ is small, even if the page $P_{21}$ is displayed on the display unit 14, the probability that the user quickly reads the page $P_{21}$ and performs page-turning operation to proceed to the next page $P_{22}$ is high. As such, if the number of the character region candidates in the page $P_{21}$ is less than the reference value, the page related data generating unit 104 may further extract character region candidates in the page $P_{22}$ subsequent to the page $P_{21}$ to generate and store page related data. In the variation (1-2), the character region candidates in the page $P_{22}$ are extracted, and in the variation (2-4), the character regions in the page $P_{22}$ are extracted. Other than these points, the variation (2-4) is the same as the variation (1-2).

According to the variation (2-4), if the number of the character regions in the page $P_{21}$ is small, page related data of the next page $P_{22}$ is also generated. As such, even if the user reads the page $P_{21}$ in a short time and displays the page $P_{22}$, the page related data can be generated by the time the page $P_{22}$ is displayed on the display unit 14. With this configuration, it is possible to avoid such a condition that, when the user specifies the page $P_{22}$, enlarged display cannot be timely performed because the page related data is not generated yet.

(2-5) For example, similarly to the variation (1-4), the character regions may be extracted only from the upper region of the page $P_{21}$ in the embodiment 2. The page related data generating unit 104 in the variation (2-5) includes at least one of a first extracting unit 104D and a second extracting unit 104E.

The first extracting unit 104D extracts a character region not from a lower region $P_{21D}$ but from an upper region of the $P_{21U}$. The first extracting unit 104D extracts a character region only from the upper region $P_{21U}$. The meaning of the upper region $P_{21U}$ and the lower region $P_{21D}$ is the same as described in the variation (1-4). The second extracting unit 104E extracts character regions in the page $P_{21}$ in the reading order of the character regions until the number of the character regions reaches the reference value. The meaning of the reading order is the same as described in the variation (1-4). If the reference value is two, the second extracting unit 104E extracts the character regions corresponding to the character groups 24A and 24B in the page $P_{21}$ in the reading order of the character regions. The second extracting unit 104E does not extract the subsequent character region until a predetermined time arrives.

According to the variation (2-5), page related data is preferentially generated for the upper region $P_{21U}$, which is likely read by the user first when the page $P_{21}$ is displayed on the display unit 14, and regions having the early reading order. With this configuration, it is possible to avoid such a condition that, when the user specifies the page $P_{22}$, enlarged display cannot be timely performed because the page related data is not generated yet.

(3) In the following, variations regarding both of the embodiments 1 and 2 will be described. Here, a case will be described in which the features of the variation (3) are applied to the embodiment 1, although the features of the variation (3) may also be applicable to the embodiment 2.

Figure 27:
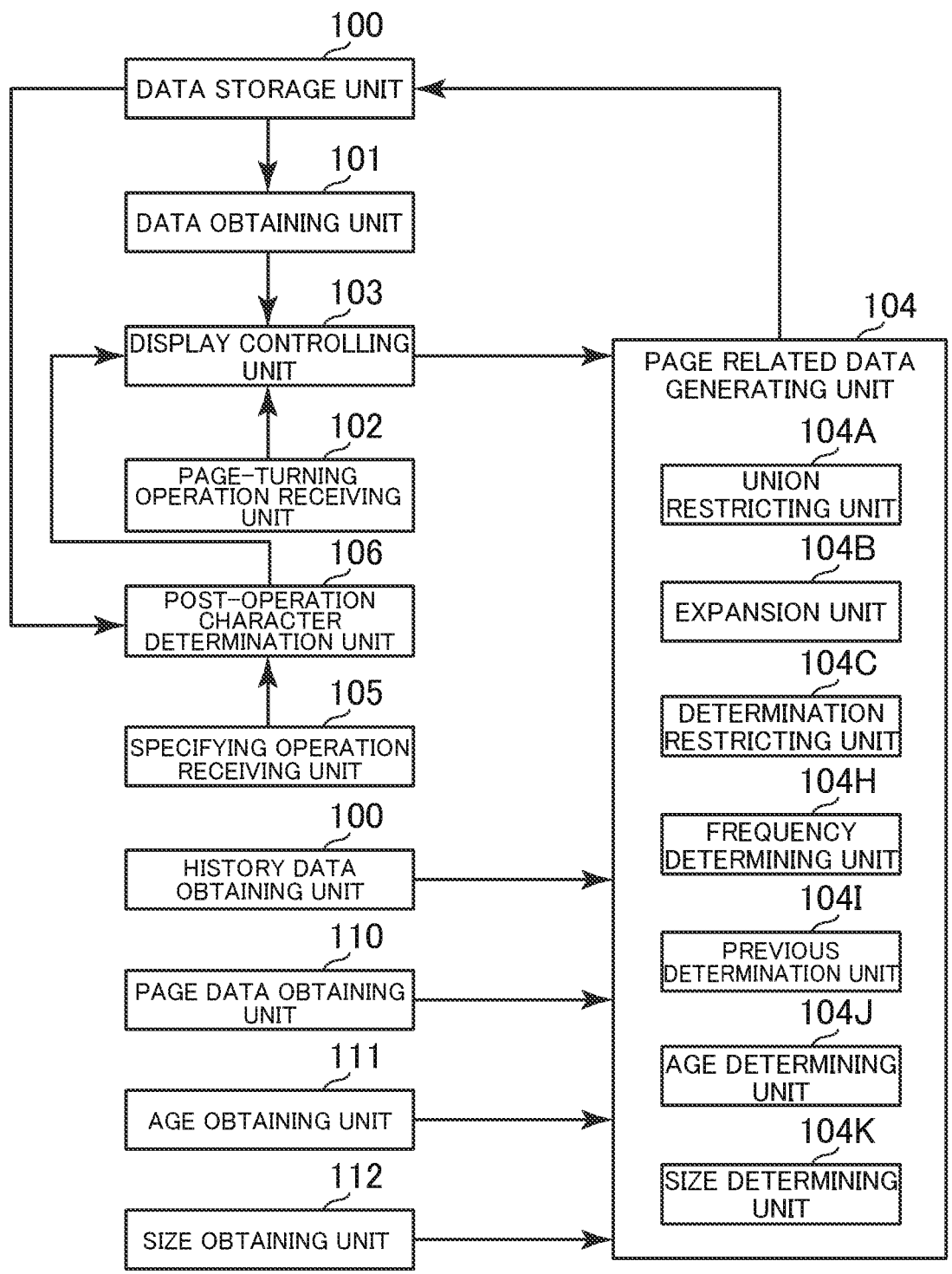
FIG. 27 is a functional block diagram of variation (3).

FIG. 27 is a functional block diagram of the variation (3). As shown in FIG. 27, at least one of a history data obtaining unit 109, a page data obtaining unit 110, an age obtaining unit 111, and a size obtaining unit 112 is implemented in addition to the functions of the embodiment 1. These functions are implemented mainly by the control unit 10. In the variation (3), similarly to the embodiment 1, a case will be described as an example in which the page related data generating unit 104 generates page related data of the page $P_{21}$.

(3-1) For example, some users may not often perform specifying operation, and thus enlarged display may be less needed. As such, history of specifying operations of users in the past may be stored, and page related data may be generated only for the users who need enlarged display.

In the variation (3-1), the history data obtaining unit 109 is implemented. The history data obtaining unit 109 obtains history data stored in the data storage unit 100 that stores history data regarding history of the specifying operation performed by the user of the electronic book display device 1. The history data may indicate the number of times the specifying operation is performed for the entire past period, or in a specific period of time. Further, the history data may indicate the number of pages on which the specifying operation is performed. For example, the specifying operation receiving unit 105 updates the history data upon receiving the specifying operation.

The page related data generating unit 104 of this variation includes a frequency determining unit 104H. The frequency determining unit 104H determines whether frequency of specifying operation performed by a user indicates a reference value or more based on the history data. For example, the frequency determining unit 104H may determine whether the number of times of the specifying operation in the entire past period is the reference value or more, or determine whether the number of times of the specifying operation in a specific period of time is the reference value or more. Alternatively, for example, the frequency determining unit 104H may determine whether a difference between the page number of the page being displayed and the page number of the page on which the user performs the latest specifying operation is the reference value or more (i.e., whether the specifying operation is not performed continuously throughout the reference number of pages or more).

The page related data generating unit 104 generates and stores page related data when the frequency determining unit 104H determines the frequency of the specifying operation is the reference value or more. In other words, the page related data generating unit 104 does not generate page related data when the frequency determining unit 104H determines the frequency is less than the reference value.

According to the variation (3-1), whether to generate page related data is determined based on the frequency of the user's specifying operation, and thus the processing can be performed in accordance with tendency of the user. That is, there is no need to generate page related data in advance for a user who less needs the enlarged display. As such, the memory capacity can be effectively used and the processing load of the electronic book display device 1 can be reduced by not generating the page related data for such a user.

(3-2) For example, when a user repeatedly reads an electronic book, there is a high likelihood that a page previously displayed in an enlarged view is displayed again. As such, the page displayed by the user in an enlarged view may be stored, and the page related data may be generated for such a page and not generated for the other pages.

In the variation (3-2), the page data obtaining unit 110 is implemented. The page data obtaining unit 110 obtains page data stored in the data storage unit 100 that stores page data of a page on which specifying operation of the user of the electronic book display device 1 is performed. The page data stores the page numbers on which the user has performed the specifying operation. For example, upon receiving the specifying operation, the specifying operation receiving unit 105 updates the page data.

The page related data generating unit 104 includes a previous determination unit 104I. The previous determination unit 104I determines whether the user has performed specifying operation on the page $P_{21}$ based on the page data. The previous determination unit 104I determines whether the specifying operation has been previously performed on the page $P_{21}$ subsequent to the page $P_{20}$ currently displayed on the display unit 14 by referring to the page data.

When the previous determination unit 104I determines that the specifying operation has been performed, the page related data generating unit 104 generates and stores page related data. In other words, the page related data generating unit 104 does not generate page related data when the previous determination unit 104I does not determine that the specifying operation has been performed.

According to the variation (3-2), whether to generate page related data is determined based on whether the specifying operation is performed on each page by the user, and thus the processing can be performed in accordance with tendency of the user. That is, there is no need to generate page related data in advance for a page that less needs to be displayed in an enlarged view. As such, the memory capacity can be effectively used and the processing load of the electronic book display device 1 can be reduced by not generating the page related data for such a page.

(3-3) For example, there is a high likelihood that a user displays a page in an enlarged view if the page has been previously displayed in an enlarged view by another user who has read the same electronic book. As such, the page displayed in an enlarged view by other user may be stored, and page related data may be generated for such a page and not generated for the other pages.

In the variation (3-3), the page data obtaining unit 110 is implemented. The page data obtaining unit 110 obtains page data stored in a server computer that stores the page data of a page on which the specifying operation is performed by other user than the user of the electronic book display device 1. The page data obtaining unit 110 obtains the page data through a network. The server computer manages electronic books. When a user who has downloaded an electronic book performs specifying operation, the electronic book display device 1 of the user sends, to a server computer, data indicative of a page $P_N$ on which the specifying operation is performed. Upon receiving the data, the server computer updates the page data stored in the database.

The previous determination unit 104I determines whether the specifying operation has been performed on at least one page by other user based on the page data. The determination method is the same as that of the variation (3-2). When the previous determination unit 104I determines that the specifying operation has been performed, the page related data generating unit 104 generates and stores page related data. In other words, the page related data generating unit 104 does not generate page related data when the previous determination unit 104I does not determine that the specifying operation has been performed.

According to the variation (3-3), whether to generate page related data is determined based on whether the specifying operation is performed on each page by other users, and thus the processing can be performed in accordance with tendency of generic users. That is, if the other users less feel the need to display a page in an enlarged view, the user of the electronic book display device 1 also less likely to perform the specifying operation on such a page, and thus there is no need to generate page related data of the page in advance. As such, the memory capacity can be effectively used and the processing load of the electronic book display device 1 can be reduced by not generating the page related data for such a page.

(3-4) For example, older users more likely to display a page in an enlarged view. As such, page related data may be generated only for older users. In the variation (3-4), the age obtaining unit 111 is implemented. The age obtaining unit 111 obtains age information regarding an age of the user of the electronic book display device 1. For example, the data storage unit 100 may store the age information. In this case, the age obtaining unit 111 obtains the age information from the data storage unit 100. The age information may be information that can specify the user's age, for example, a value indicative of the user' age or a date of birth. The age obtaining unit 111 may calculate the user's age. For example, the age obtaining unit 111 may estimate the user's age by obtaining the year of publication of the electronic book or the average age of users who have written reviews of the electronic book from the user profiles in the server computer.

The page related data generating unit 104 includes the age determining unit 104J. The age determining unit 104J determines whether the user's age is a reference age or more based on the age information. The reference age is stored in the data storage unit 100. The reference age may be a fixed value or a variable value.

When the age determining unit 104J determines that the user's age is the reference age or more, the page related data generating unit 104 generates and stores page related data. That is, if the age determining unit 104J determines the user's age is less than the reference age, the page related data generating unit 104 does not generate the page related data.

According to the variation (3-4), whether to generate the page related data is determined by referring to the user's age, and thus the processing can be performed in accordance with tendency of the user. That is, there is no need to generate page related data in advance for relatively younger users who are less likely to need expanded display. As such, the memory capacity can be effectively used and the processing load of the electronic book display device 1 can be reduced by not generating the page related data for such users.

(3-5) For example, if a screen size of the display unit 14 is small, probability of an enlarged display is high. As such, the page related data may be generated only when the screen size is small, and not generated when the screen size is large.

In the variation (3-5), the size obtaining unit 112 is implemented. The size obtaining unit 112 obtains size information regarding a screen size of the display unit 14. For example, the data storage unit 100 may store the size information. The size information indicates, for example, the number of inches of the display unit 14.

The page related data generating unit 104 includes the size determining unit 104K. The size determining unit 104K determines whether the screen size of the display unit 14 is less than a reference size based on the size information. The reference size is stored in the data storage unit 100. The reference size may be a fixed value or a variable value.

When the size determining unit 104K determines that the screen size is less than the reference size, the page related data generating unit 104 generates and stores page related data. That is, when the size determining unit 104K determines that the screen size is the reference size or more, the page related data generating unit 104 does not generate the page related data.

According to the variation (3-5), whether to generate the page related data is determined by referring to the screen size of the display unit 14, and thus the processing can be performed in accordance with the display unit 14. That is, there is no need to generate page related data in advance for the display unit 14 that has a large screen size, which is less likely to be expanded for display. As such, the memory capacity can be effectively used and the processing load of the electronic book display device 1 can be reduced by not generating the page related data for such a display unit 14.

(4) In addition to the variations (1) to (3) described above, the following variations may be applicable.

For example, the method for extracting the character region candidate may be any method that can extract a region having the potential to be a character region, and various known methods may be used. Other than the method described in the embodiment 1, for example, a region having a size within a predetermined range may be extracted as a character region candidate. Similarly, various known methods may be applicable to the character determination method.

For example, in the above description, the case has been described in which the page related data is generated for the page $P_{N+1}$ subsequent to the page $P_N$ being displayed on the display unit 14, although the page related data generating unit 104 may generate page related data of the page $P_{N+2}$, which is two pages after the page $P_N$, and the range of the pages for which the page related data is generated is not limited to the above example. Similarly, the page related data of the page $P_{N-1}$, which is one page before the page $P_N$ being displayed on the display unit 14, may be generated. Whether to generate page related data of the previous page $P_{N-1}$ or the subsequent page $P_{N+1}$ may be determined whether the page is returned by the page-turning operation. That is, whether to generate page related data of the previous page $P_{N-1}$ or the subsequent page $P_{N+1}$ may be determined based on the direction in which the page is turned.

For example, the number of pages for which page related data is generated may be determined in accordance with the memory capacity or the remaining memory capacity of the electronic book display device 1. For example, when the memory capacity or the remaining memory capacity of the electronic book display device 1 is larger, page related data of more number of pages may be generated. Alternatively, for example, the number of pages for which the page related data is generated may be determined in accordance with the page turning speed. For example, when the page turning speed is faster, page related data of more number of pages may be generated. The page turning speed may be calculated based on the intervals of time at which the user performs the page-turning operation. Further, reading time of each page $P_N$ may be calculated to determine the number of pages for which the page related data is generated based on the calculated reading time. For example, when the reading time is shorter, page related data of more number of pages may be generated. The reading time may be calculated using the number of contours or the size of the regions.

For example, automatic page-turning function may be provided in order to turn pages without the user's operation. In this case, the display controlling unit 103 displays a page on the display unit 14 for a predetermined period of time, then turns the page to the next page.

For example, characters written in each frame 21 may represent not only spoken words of the characters, but also feelings of the characters or sound effects of the comics. Such characters may be recognizable as a set of characters by the expansion unit 104B expanding the regions. In this embodiment, by way of example, the words in the comics are written in English, although any other language may be used if the characters of the language are recognized by the electronic book display device 1. Further, the case has been described in which the spoken words of the characters are written horizontally, although the spoken words may be written vertically. In this case, the learning pattern for horizontal writing and the learning pattern for vertical writing are prepared in the data storage unit 100, and if a character region candidate is determined as a character region in either one of the learning pattern for horizontal writing and the learning pattern for vertical writing, the post-operation character determination unit 106 determines the character region candidate as a character region.

For example, the binarization reversal processing performed by the union restricting unit 104A may be omitted. In the embodiment, by way of example, the characters are surrounded by the balloon, although the characters may not necessarily be surrounded by the balloon. In this case, the processing of the union restricting unit 104A may be omitted. The characters are written in predetermined fonts, or in handwriting. The characters in handwriting may be recognizable as a set of characters by the processing of the expansion unit 104B. Further, the characters may be different in fonts, sizes, colors, and brightness for each balloon, frame, and page. Even if the fonts, sizes, colors, and brightness are different, the characters are recognizable as a set by expanding the regions in the image by the expansion unit 104B.

For example, the case has been described in which a character region candidate is displayed in an enlarged view when the post-operation character determination unit 106 determines that the character region candidate includes a character, although the processing performed on the character region candidate determined as including a character is not limited to the enlarged display. Alternatively, the electronic book display device 1 may translate the characters in the character region candidate determined as including a character, or output machine-generated speech. Further, the electronic book display device 1 may extract characters in the character region candidate determined as including a character using the OCR, and stores data of the extracted characters in the storage unit 11 so that the characters can be searched in the electronic book. Further, the display controlling unit 103 may expand a display based on the data of the characters detected by the OCR instead of cutting out regions in the character region candidate determined as a character region for an enlarged display.

For example, in the embodiment, comics is taken as an example of the electronic book, although the present invention may be applicable to any electronic book that includes a character. For example, in a similar way to the embodiment, a character region can be extracted from, for example, a picture book and a magazine, in which a given space is provided around characters. As such, the present invention may be applicable to a picture book or a magazine, for example.

The invention claimed is:

1. An electronic book display method comprising:
    obtaining electronic book data including a plurality of pages stored in a first storage which stores the electronic book data;
    displaying, on a screen, one or more pages specified in the plurality of pages based on the electronic book data obtained in the data obtaining step;
    generating page related data by detecting objects from at least one of the pages that is at least one of preceding and succeeding pages to the one or more pages, the page related data being one or more character region candidates or character regions,
        wherein the objects are depicted on the at least one of the pages separate from a background; and
    writing the generated page related data in a second storage,
    wherein the page related data is generated after displaying the one or more pages and before displaying the at least one of the preceding or succeeding pages.

2. A non-transitory computer-readable information storage medium for storing a program for causing a computer to:
    obtain electronic book data including a plurality of pages stored in a first storage;
    displays, on a screen, one or more pages specified in the plurality of pages based on the electronic book data;
    generate page related data by detecting objects from at least one of the pages that is at least one of preceding and succeeding pages to the one or more pages, the page related data being one or more character region candidates or character regions;
        wherein the objects are depicted on the at least one of the pages separate from a background; and
    write the generated page related data in a second storage,
    wherein the computer generates the page related data after displaying the one or more pages and before displaying the at least one of the preceding or succeeding pages.

3. An electronic book display device comprising at least one processor configured to:
    obtain electronic book data including a plurality of pages stored in a first storage which stores the electronic book data;
    display, on a screen, one or more pages specified in the plurality of pages based on the electronic book data;
    generate page related data by detecting objects from at least one of the pages that is at least one of preceding and succeeding pages to the one or more pages, the page related data being one or more character region candidates or character regions;
        wherein the objects are depicted on the at least one of the pages separate from a background; and
    write the generated page related data in a second storage,
    wherein the at least one processor generates the page related data after displaying the one or more pages and before displaying the at least one of the preceding or succeeding pages.

4. The electronic book display device according to claim 3, wherein the at least one processor:
    extracts one or more character region candidates in the at least one of the pages to generate and write the page related data before the at least one of the pages is displayed on the screen,
    receives a specifying operation of the character region candidate when the screen displays the at least one of the pages; and
        determines, after the specifying operation, whether the character region candidate specified by the specifying operation includes a character, and
    expands and displays an inside of the character region candidate that is determined as including a character.

5. The electronic book display device according to claim 4, wherein the at least one processor:

performs first character determination processing on the character region candidate before the specifying operation, and performs second character determination processing that has higher accuracy than the first character determination processing when the specifying operation specifies the character region candidate that is determined as including a character.

6. The electronic book display device according to claim 4, wherein the at least one processor:

further extracts one or more character region candidates in a page subsequent to the at least one of the pages to generate and write page related data if a number of the character region candidates in the at least one of the pages is less than a reference value.

7. The electronic book display device according to claim 4, wherein the at least one processor:

determines whether a size of a contour of the character region candidate or a size of the character region candidate is equal to or more than a reference size, does not perform determination on the character region candidate that is determined as having a size less than the reference size, and determines whether a character is included in the character region candidate that is determined to have a size greater than or equal to the reference size.

8. The electronic book display device according to claim 7, wherein data indicating a position of the contour is used for identifying the character region candidate.

9. The electronic book display device according to claim 4, wherein the at least one processor:

extracts the character region candidate in an upper region of the at least one of the pages;

does not extract the character region candidate in a lower region of the at least one of the page; and/or extracts the character region candidates in a reading order of one or more character regions in the at least one of the pages until a number of the character region candidates reaches the reference value.

10. The electronic book display device according to claim 3, wherein the at least one processor:

extracts the character regions in the at least one of the pages to generate and write the page related data before the at least one of the pages is displayed on the display, receives a specifying operation of the character region when the at least one of the pages is displayed on the display, and expands and displays an inside of the character region specified by the specifying operation when the specifying operation is received.

11. The electronic book display device according to claim 10, wherein the at least one processor:

extracts the character region candidate in the at least one of the pages before the at least one of the pages is displayed on the screen, and determines whether the character region candidate includes a character.

12. The electronic book display device according to claim 11, wherein the at least one processor:

performs first character determination processing on the character region candidate before the at least one of the pages is displayed on the display, and extracts the character region by performing second character determination processing on the character region candidate that is determined by the first character determination processing as including a character, wherein the second character determination processing has a higher accuracy than the first character determination processing.

13. The electronic book display device according to claim 11, wherein the at least one processor:

determines whether the size of the contour of the character region candidate or the size of the character region candidate is greater than or equal to the reference size, and extracts the character region by not performing a determination on the character region candidate that is determined to have a size less than the reference size and by determining whether the character region candidate that is determined to have a size greater than or equal to the reference size includes a character.

14. The electronic book display device according to claim 10, wherein the at least one processor:

extracts one or more character regions in a page subsequent to the at least one of the pages to generate and write page related data if the number of the character regions in at least one of the pages is less than the reference value.

15. The electronic book display device according to claim 10, wherein the at least one processor:

extracts the character region in the upper region of the at least one of the pages;

does not extract the character region in the lower region of the at least one of the pages; and/or extracts the character regions in a reading order of the character regions in the at least one of the pages until a number of the character regions reaches a reference value.

16. The electronic book display device according to claim 4, wherein the at least one processor:

obtains history data stored in a third storage, said history data relates to a history of the specifying operation by a user of the electronic book display device, determines whether frequency of the specifying operation by the user is greater than or equal to a reference value based on the history data, and generates and writes the page related data when the frequency is greater than or equal to the reference value.

17. The electronic book display device according to claim 4, wherein the at least one processor:

obtains page data stored in a storage, which relates to a page on which the specifying operation is performed by the user of the electronic book display device, determines whether the specifying operation has been performed by the user on the at least one of the pages based on the page data, and generates and writes the page related data when the specifying operation has been performed.

18. The electronic book display device according to claim 4, wherein the at least one processor:

obtains page data stored in a storage, the page data stores a page on which a specifying operation is performed by a user other than the user of the electronic book display device, determines whether the specifying operation has been performed on the at least one of the pages by the other user based on the page data, and generates and writes page related data when the specifying operation has been performed.

19. The electronic book display device according to claim 4, wherein the at least one processor:

obtains age information about an age of the user of the electronic book display device, determines whether the age of the user is greater than or equal to a reference age based on the age information, and generates and writes the page related data when the age of the user is greater than or equal to the reference age.

20. The electronic book display device according to claim 4, wherein the at least one processor:

obtains size information relating to a screen size of the screen, determines whether the screen size of the screen is less than a reference size based on the size information, and generates and writes the page related data when the screen size of the display is less than the reference size.

* * * * *